United States Patent
Bliss et al.

(10) Patent No.: US 9,762,454 B2
(45) Date of Patent: Sep. 12, 2017

(54) SYSTEM AND METHOD TO CAPTURE AND DOCUMENT CROSS-PRODUCT COMPATIBILITY STATUS INFORMATION FOR INDUSTRIAL DEVICES

(71) Applicant: Rockwell Automation Technologies, Inc., Mayfield Heights, OH (US)

(72) Inventors: Ronald Bliss, Twinsburg, OH (US); Dennis M. Wylie, Mentor, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 314 days.

(21) Appl. No.: 14/708,068

(22) Filed: May 8, 2015

(65) Prior Publication Data
US 2016/0330082 A1 Nov. 10, 2016

(51) Int. Cl.
*G06F 3/00* (2006.01)
*H04L 12/24* (2006.01)
*G06F 3/0484* (2013.01)
*G06F 3/01* (2006.01)

(52) U.S. Cl.
CPC .......... *H04L 41/22* (2013.01); *G06F 3/04842* (2013.01); *H04L 41/0873* (2013.01)

(58) Field of Classification Search
None
See application file for complete search history.

(56) References Cited

U.S. PATENT DOCUMENTS

| | | | | |
|---|---|---|---|---|
| 2004/0139232 A1* | 7/2004 | Giannetti | ............ | G06F 17/3089 709/246 |
| 2005/0234846 A1* | 10/2005 | Davidson | ............... | G06F 9/4416 |
| 2011/0165869 A1* | 7/2011 | Guzman | ................. | H04W 8/24 455/418 |
| 2012/0170067 A1* | 7/2012 | Watanabe | ............. | G06F 3/1206 358/1.13 |
| 2013/0217445 A1* | 8/2013 | Chan | ................... | H04M 1/0254 455/566 |
| 2014/0304278 A1* | 10/2014 | Kleiman | ........... | G06F 17/30277 707/749 |
| 2014/0344799 A1* | 11/2014 | Thodati | ..................... | G06F 8/65 717/171 |
| 2015/0317235 A1* | 11/2015 | Lachambre | ......... | G06F 11/3668 717/126 |
| 2016/0042070 A1* | 2/2016 | Rossi | ................ | G06F 17/30864 707/709 |

(Continued)

*Primary Examiner* — Toan Vu
(74) *Attorney, Agent, or Firm* — Amin, Turocy & Watson, LLP

(57) ABSTRACT

A device compatibility information system captures, processes, and presents cross-product compatibility status information for industrial devices. The system can receive device compatibility information from both device vendors as well as end users of the industrial devices in order to rapidly accumulate device compatibility information for large numbers of industrial device pairs. In some embodiments, the system can also automatically discover and collect device and system configuration information from industrial devices already deployed at a plant facility and infer device compatibility information from the collected configuration information. The system can use this inferred compatibility information to populate the stored set of device compatibility status information, which can be accessed and viewed by authorized users.

19 Claims, 24 Drawing Sheets

(56) References Cited

U.S. PATENT DOCUMENTS

2016/0125080 A1* 5/2016 Glover .............. G06F 17/30864
707/706
2016/0335561 A1* 11/2016 O'Leary ........... G06F 17/30598

* cited by examiner

FIG. 4

COMPARE SELECTIONS

Compatibility between selected products and supportability attributes for those products. Click on any icon in the grid to view more information in the knowledgebase

SELECTIONS | DOWNLOADS

| | 1756-L74 | 1756-IA8D | 1756-IA32 | 1756-IA16I | 1756-IA16 | 1756-DHRIO |
|---|---|---|---|---|---|---|
| Series | Series B | Series A | Series A | Series A | Series A | Series E |
| Version | 24.011 | 3.00x | 3.00x | 3.00x | 3.1 | 7.003 |
| Downloads Information | | | | | | |
| Compatibility | | | | | | |
| 1756-L74 (Series B) 24.011 | | ● | ● | ● | ● | ● |
| 1756-IA8D (Series A) 3.00x | ● | | | | | |
| 1756-IA32 (Series A) 3.00x | ● | | | | | |
| 1756-IA16I (Series A) 3.00x | ● | | | | | |
| 1756-IA16 (Series A) 3.1 | ● | | | | | |
| 1756-DHRIO (Series E) 7.003 | ● | | | | | |
| Supportability | | | | | | |
| System Features | | | | | | |
| General | | | | | | |
| Auto-Save and Recovery | ● | | | | | |
| Activation Key Software Grace Period | ● | | | | | |
| System Install | ● | | | | | |
| Start Page | ● | | | | | |
| Online Help, Instruction Context Sensitive | ● | | | | | |
| Integrated System Install | ● | | | | | |
| Language Switching, Multi-lingual Project Documentation | ● | | | | | |
| Sample Projects | ● | | | | | |
| Electronic Data Sheet AOP | ● | | | | | |
| Logix Tree, Module Discovery | ● | | | | | |
| Logix Tree, Enhancements to Finding-Adding Devices | ● | | | | | |
| Tool Windows, Auto-Hide | ● | | | | | |
| Logix Designer, Design Environment and Application | ● | | | | | |
| Project Documentation Stored in Controller | ● | | | | | |

FIG. 11

SYSTEM AND METHOD TO CAPTURE AND DOCUMENT CROSS-PRODUCT COMPATIBILITY STATUS INFORMATION FOR INDUSTRIAL DEVICES

BACKGROUND

The subject matter disclosed herein relates generally to industrial automation systems, and, for example, to a cross-product compatibility status system that facilitates collection and provision of compatibility status information for industrial devices.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for collecting and rendering device compatibility status information is provided, comprising a compatibility data storage area configured to store compatibility status information identifying compatibility statuses for multiple pairs of industrial devices; an interface component configured to receive, via one or more interface displays delivered to a client device, selection information from the client device that identifies a set of industrial devices; a search component configured to retrieve a subset of the compatibility status information, for at least two industrial devices of the set of industrial devices, from the compatibility data storage area based on the selection information, wherein the interface component is further configured to render the subset of the compatibility status information on the client device via the one or more interface displays; and a correlation component configured to update the subset of the compatibility status information stored in the compatibility data storage area in accordance with new compatibility status information, for the at least two industrial devices, received via the one or more interface displays, wherein the correlation component updates the subset of the compatibility data based on a user role associated with the client device.

Also, one or more embodiments provide a method for updating and rendering device compatibility information, comprising storing, by a system comprising at least one processor, compatibility status information on a compatibility data store, wherein the compatibility status information identifies compatibility statuses for multiple pairs of industrial devices; receiving, by the system via interaction with one or more interface displays, selection information from a client device, wherein the selection information identifies at least two industrial devices; retrieving, by the system from the compatibility data store, a subset of the compatibility status information for the at least two devices based on the selection information; displaying, by the system, the subset of the compatibility status information on the client device via the one or more interface displays; receiving, by the system from the client device, new compatibility status information for the at least two industrial devices via interaction with the one or more interface displays; determining, by the system, a user role associated with the client device; and modifying, by the system, the subset of the compatibility status information in accordance with the new compatibility status information, wherein the modifying comprises modifying the subset of the compatibility data based on the user role.

Also, according to one or more embodiments, a non-transitory computer-readable medium is provided having stored thereon instructions that, in response to execution, cause a system to perform operations, the operations comprising storing compatibility status information on a compatibility data storage memory, wherein the compatibility status information defines compatibility statuses for multiple pairs of industrial devices; receiving, via interaction with one or more interface displays, selection information from a client device, the selection information identifying a pair of industrial devices; retrieving from the compatibility data storage memory, a subset of the compatibility status information for at pair of industrial devices based on the selection information; displaying the subset of the compatibility status information on the client device via the one or more interface displays; receiving, from a client device, new compatibility status information for the pair of industrial devices via interaction with the one or more interface displays; determining a user role associated with the client device; and modifying the subset of the compatibility status information in accordance with the new compatibility status information, wherein the modifying comprises modifying the subset of the compatibility data based on the user role.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 4 is an example compatibility result screen for rendering compatibility status information for selected industrial devices.

FIG. 11 is an example module properties window illustrating types of module-level information that can be discovered and indexed by an indexing system.

DETAILED DESCRIPTION

Figure 1:
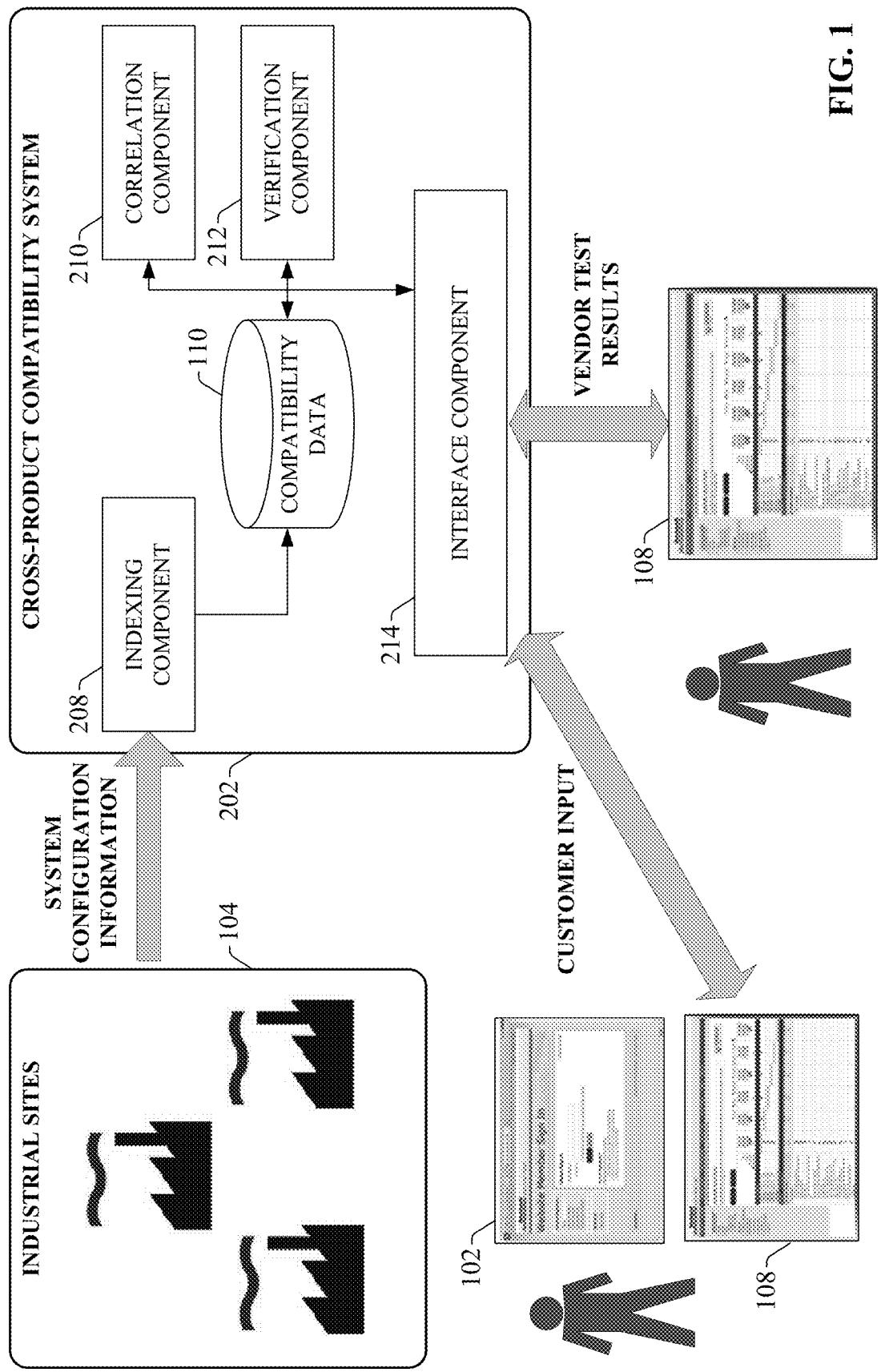
FIG. 1 is a diagram illustrating a general overview of the cross-product compatibility system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modem automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such platforms.

A typical industrial control system comprises a large number of disparate devices—industrial controllers, telemetry devices, motor drives, human-machine interfaces (HMIs), vision systems, network devices, etc.—that interact with one another to carry out one or more industrial processes. The set of devices comprising a given industrial control system may comprise devices manufactured by a single control equipment vendor, or may comprise devices from multiple different vendors. In either scenario, control system engineers must consider cross-product compatibility when selecting devices for inclusion in their control systems. Cross-product compatibility refers to the ability of two interactive devices to work together correctly to perform their respective tasks. For example, before installing a particular model of I/O module into an existing industrial controller, a designer must confirm that the selected I/O module will operate correctly with that particular model of industrial controller. Similarly, if an HMI module or motor drive is to be networked to an industrial controller, the designer must be assured that these particular devices will communicate properly under that configuration. Device compatibility is often a function of not only the vendors and models of the devices, but also the particular firmware or software revisions installed on the devices.

Standardizing a plant's control systems by purchasing control devices exclusively from a single vendor does not necessarily guarantee that all devices obtained from that vendor will be compatible with one another. This is because control equipment manufactures often have separate design teams working on development of the various product lines offered by that vendor. Although these design teams typically perform compatibility testing between their various devices in parallel with product development, vendors with many products and product lines may not have the time or resources to perform compatibility testing between every product they offer prior to releasing new products or software upgrades to the public. Comprehensive compatibility testing is further complicated by the fact that some devices may undergo occasional firmware or software upgrades, creating the possibility that different instances of the same device hardware platform (e.g., a given device model) may have different firmware or software revisions. In such circumstances, a particular device model (e.g., a variable frequency drive, an HMI terminal, etc.) may operate correctly with a particular industrial controller when installed with one firmware version, but not when installed with another (older or newer) firmware version. Comprehensive pre-release compatibility testing becomes even more impractical when cross-vendor device compatibility is considered. For example, some control system designers choose to combine devices from different vendors into a single control system, requiring products from different equipment vendors to interact with one another to carry out an industrial process.

To address these and other issues, one or more embodiments of the present disclosure provides a system for capturing, processing, and presenting cross-product compatibility status information obtained from a variety of sources. FIG. 1 is a general overview of the cross-product compatibility system 202. The system leverages vendor test results, user feedback provided via customer input, and automatically collected customer system configuration information to build and maintain a dynamically evolving device compatibility data set 110 that can be accessed by system designers when choosing device models and firmware/software revisions for implementation on their own unique industrial control systems.

In one or more embodiments, the cross-product compatibility system 202 can generate and serve a web-based or cloud-based compatibility result screen 108 that allows a user to select a set of devices—including specifying the device vendor, model, firmware, and/or software revision—for which compatibility verification is to be performed. The compatibility results screen 108 renders compatibility status indications for each combination of devices within the selected set, and in some embodiments can render function-level compatibility status indications. The compatibility status information provided to the user via the compatibility results screen 108 is based not only on vendor test results entered into the system, but also on feedback information entered into the system by end users (e.g., via the Internet) based on their experiences in integrating the devices into their own industrial control systems. In some embodiments, the system 202 may also obtain some of the compatibility status data by remotely collecting system configuration information from one or more industrial automation system in use at one or more industrial sites 104. This system configuration information can include, for example, network topology information, I/O module configuration data, network device configuration data, or other system configuration information retrieved from an industrial controller or other source of configuration data. The system configuration information can also specify the firmware or software versions currently installed on one or more of the control devices. The cross-product compatibility system 202 can analyze this configuration data to identify at least two devices (e.g., controllers, I/O modules, I/O devices, HMI terminals, network devices, etc.) configured for interactive operation as part of the user's control system. The system can infer compatibility between the at least two devices based on results of the analysis, and update the compatibility data set 110 based on this inferred compatibility.

These techniques can result in faster collection of product compatibility data relative to building such compatibility data based solely on entries submitted by product developers, and can produce a more comprehensive set of product compatibility data for access by end users; e.g., by generating compatibility status information for larger numbers of device and software combinations relative to techniques based on vendor testing alone.

Figure 2:
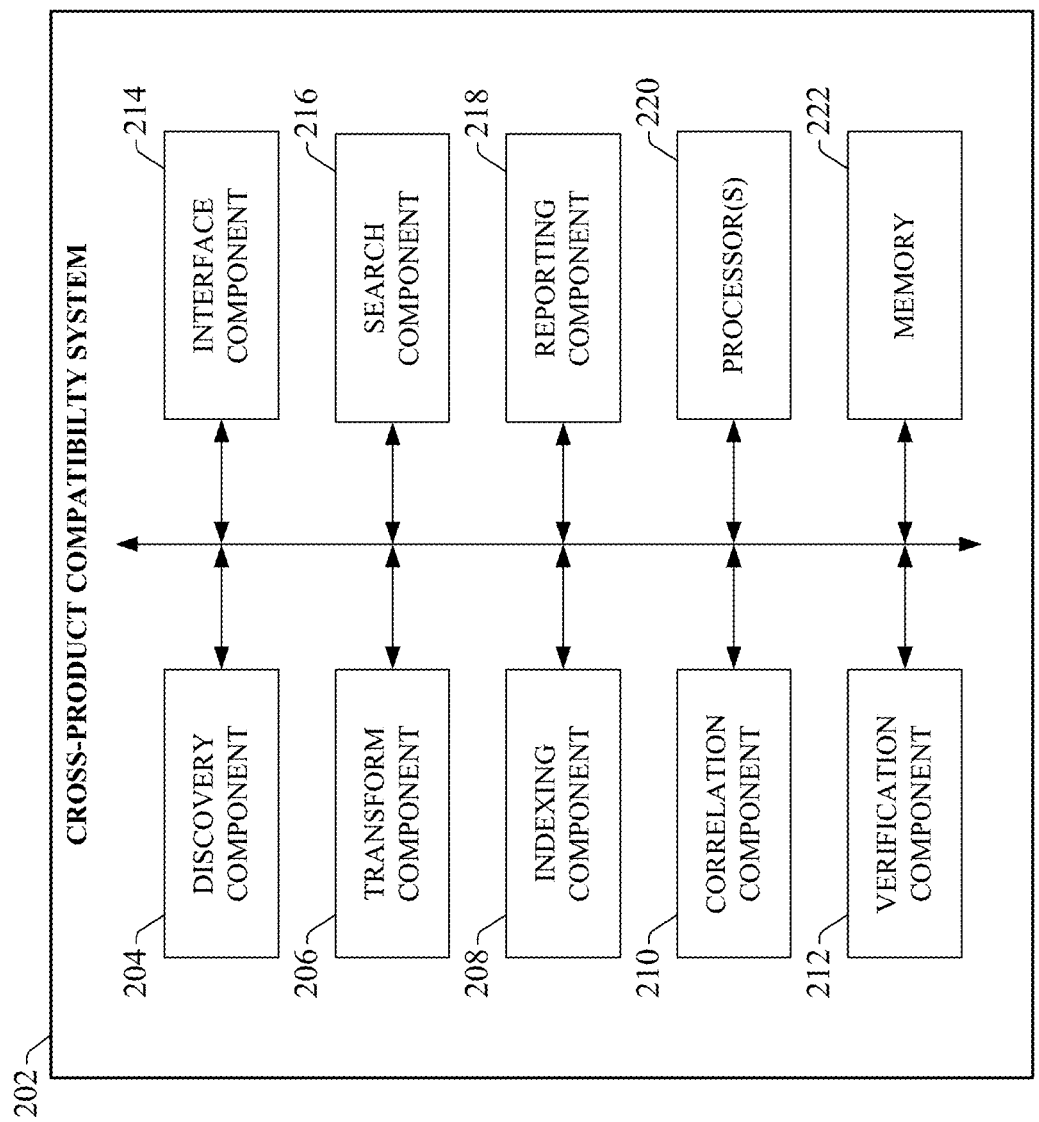
FIG. 2 is a diagram of an example cross-product compatibility system.

FIG. 2 is a block diagram of an example cross-product compatibility system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Cross-product compatibility system 202 can include a discovery component 204, a transform component 206, an indexing component 208, a correlation component 210, a verification component 212, an interface component 214, a search component 216, a reporting component 218, one or more processors 220, and memory 222. In various embodiments, one or more of the discovery component 204, transform component 206, indexing component 208, correlation component 210, verification component 212, interface component 214, search component 216, reporting component 218, the one or more processors 220, and memory 222 can be electrically and/or communicatively coupled to one another to perform one or more of the functions of the cross-product compatibility system 202. In some embodiments, components 204, 206, 208, 210, 212, 214, and 218 can comprise software instructions stored on memory 222 and executed by processor(s) 220. Cross-product compatibility system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

Discovery component 204 can be configured to gather system configuration information from one or more industrial automation devices (e.g., industrial controllers or other data sources). The discovery component 204 can also be configured to discover interdependencies between the data items. Transform component 206 can be configured to transform and tag the data discovered by the discovery component 204 prior to indexing. This can include, for example, transforming heterogeneous data items discovered on different types of data platforms to a homogeneous format for indexing under a common namespace, tagging the discovered data with relevant contextual information—e.g., a plant, production area, machine, or device on which the data was discovered; a relationship or interdependency between a given data item and another data item; a data platform corresponding to the data item (e.g., industrial control program, HMI application, knowledgebase article, device documentation, etc.)—or other data modifications. The indexing component 208 can be configured to update a cross-product compatibility data set based on the discovered and transformed data. The resulting data set can provide highly granular product compatibility status information indicating compatibility (or non-compatibility) between selected device models, firmware revisions, software revisions, etc.

Correlation component 210 can be configured to analyze system configuration information received via the indexing component 208 or via direct user input in view of previously obtained cross-product compatibility data and update the compatibility data set based on results of the analysis. For example, the correlation component 210 can analyze system configuration information read from an industrial controller's configuration settings, where the system configuration information identifies the model of the industrial controller, the firmware revision installed on the industrial controller, the models of I/O modules installed in the industrial controller, the I/O devices configured for each I/O point of the respective I/O modules, the network settings configured for the industrial controller (which may include the networked devices configured to communicate with the industrial controller), and other such information. The correlation component 210 can learn or infer cross-product compatibility information based on this system configuration information (e.g., infer that the I/O modules configured for the controller are compatible with that model of controller running that firmware revision, infer that the networked devices identified by the network configuration settings are compatible with that controller/firmware combination, etc.) and update the product compatibility data set based on results of this analysis.

Verification component 212 can be configured to verify user-provided or automatically obtained device compatibility information and make a decision regarding whether to use the received information to update the larger compatibility data set based on one or more defined verification criteria. Interface component 214 can be configured to exchange data with a client device (e.g., a desktop computer, a laptop computer, a tablet computer, a wearable computer, a mobile phone or other mobile personal device, etc.) to facilitate user interaction with the compatibility system 202. This can include, for example, generating and serving user interface screens to the client device that allow the user to submit requests for compatibility information for selected devices, view compatibility data enter compatibility information for selected devices, and view compatibility status information for selected devices. The search component 216 can be configured to search the compatibility data set based on user-provided search criteria (e.g., selection of devices to be compared for compatibility purposes, firmware selections, etc.) and retrieve compatibility status information from the data set for presentation to the user based on the search criteria. The reporting component 218 can be configured to retrieve device or compatibility information for a selected device of set of devices and present this information via a user's client device.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
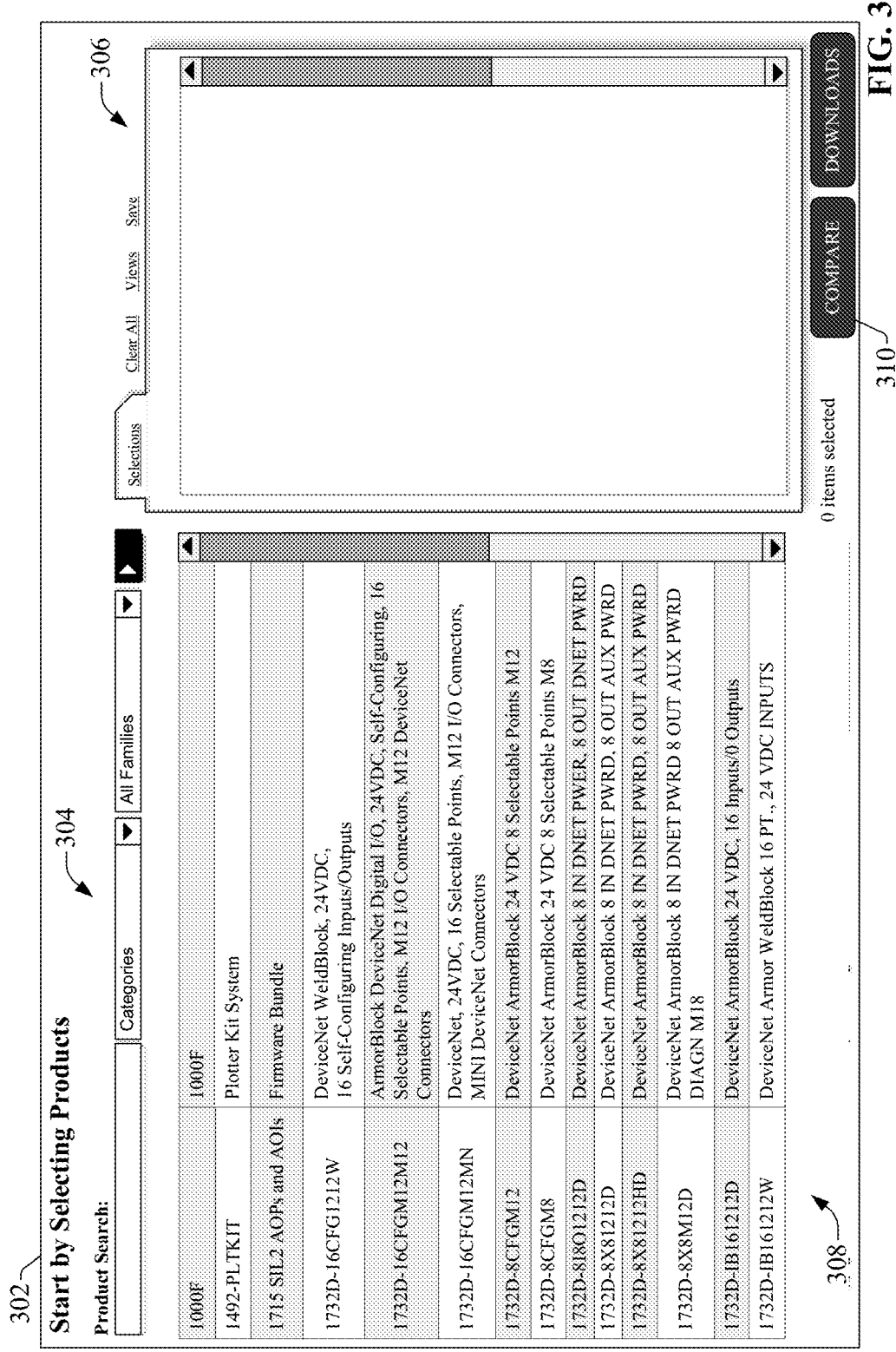
FIG. 3 is an example product selection interface screen for selecting a set of devices for which compatibility is to be determined

FIG. 3 is an example, non-limiting product selection screen 302 that can be generated by the interface component 214 and delivered to a user's client device for selecting a set of devices for which compatibility is to be determined In this example, the product selection screen 302 includes a search input area 304 that allows the user to enter search criteria for retrieving a set of available industrial devices for which compatibility information is available. On example product selection screen 302, the search input area 304 includes a keyword window for entering a search keyword, a Categories drop-down menu for selecting a category or type of industrial devices (e.g., industrial controllers, motor drives, I/O devices, motor control devices, motion control devices, industrial safety devices, power conditioning devices, etc.), and a Family drop-down box for selecting a family of devices (e.g., a product line offered by a product vendor). Based on the criteria entered in the search input area 304, the search component 216 will retrieve a set of industrial devices satisfying the entered search criteria, and for which the compatibility system 202 has available compatibility status information. The retrieved devices are listed in a search result window 308.

The product selection screen 302 allows the user to select devices from the search result window 308 for which compatibility information is desired. The user can select a device by dragging and dropping a selected device from the search result window 308 to a selection window 306 on the right-hand side of the screen 302, by double-clicking on the selected device, or by other suitable interaction with the product selection screen 302. Selected devices will appear in the selection window 306 in list form. Once all devices for which cross-product compatibility status information is desired have been selected (that is, all desired devices are listed in the selection window 306), the user can retrieve compatibility status information for the selected devices by selecting a Compare button 310. When the Compare button 310 is selected, a compatibility search request identifying the selected devices is sent to the search component 216 (via interface component 214), which performs a search of the compatibility data set 110 using the selected devices as search criteria. In particular, search component 216 retrieves compatibility status information for each combination of two devices selected from the set of devices submitted to the system, where the compatibility status information indicates whether those two devices are known to be compatible or incompatible. The search component 216 then returns the retrieved compatibility information to the user via a suitable compatibility result screen.

FIG. 4 is an example, non-limiting compatibility result screen 108 that can be generated by the interface component 214 and delivered to a user's client device to render compatibility status information for the selected industrial devices. The devices selected by the user for compatibility comparison are listed horizontally across a device row 402 along the top of the screen. The selected devices are also listed vertically along a left-hand side of a Compatibility section 404. With this configuration, each pair of devices can be cross-referenced within a compatibility grid 408 within the Compatibility section 404, where each cell of the compatibility grid 408 displays (if available) a graphic symbol indicating whether the pair of devices represented by that cell are functionally compatible. For example, graphic symbol 410 (e.g., a green circle with an embedded check mark) indicates that I/O modules 1756-L74, Series B, version 24.011 (in the vertical list) and 1756-IA16, Series A, version 3.1 (in the horizontal list displayed in device row 402) are known to be compatible (e.g., based on results of vendor testing). If the devices are not compatible, a different symbol (e.g., a red circle with an embedded "X") will be displayed in the cell. If no compatibility information is available for a pair of devices, the cell corresponding to that pair of devices will be left empty. Cells corresponding to a cross-reference of the same device are shaded (e.g., shaded cell 412) to convey that no compatibility information is to be displayed in those cells.

In some scenarios, a pair of devices may not have a definitive compatibility status (e.g., if the devices have not been tested for compatibility by the vendor), but some other type of information may be available for the device pair. For example, the device pair may be known to be used in a large number of operating customer control systems (e.g., based on reports from customers, reports from field engineers who have performed on-site audits of customers' control systems, or system configuration information that was automatically discovered by the compatibility system using techniques to be described in more detail herein). For such device pairs, another graphic symbol (e.g., a circle with an exclamation point) may be used to indicate that the device pair's compatibility status has not been verified, but other compatibility information is available for the device pair. Upon selection of this symbol, the system can display a window that renders this additional information (e.g., information conveying that the device pair is being used in a large number of working industrial control systems).

In some embodiments, the compatibility result screen 108 can include other areas for displaying feature-level support information for each selected device. For example, compatibility result screen 108 includes a Supportability section 406 for indicating whether each selected device supports a given feature. The Supportability section 406 include a list of available features along a left-hand side, and a supportability grid 414 comprising cells that indicate—using similar graphical symbols as those used for the compatibility grid 408—whether each feature is supported by the respective devices. The features within the Supportability section 406 can be categorized into collapsible feature categories (e.g., general system features, networking features, etc.).

In one or more embodiments, the compatibility results screen 104 may also include a selectable control that causes device-specific user feedback information (or the icons that link to such user feedback information) to be optionally displayed or hidden. User feedback is described in more detail below.

Figure 5:
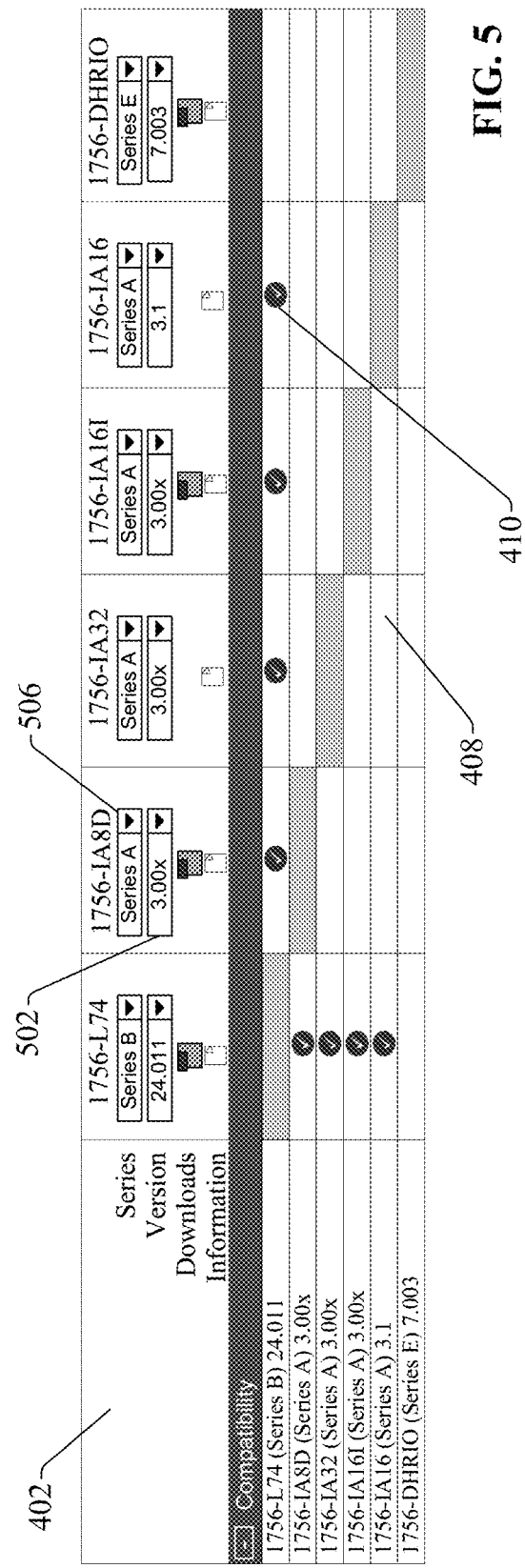
FIG. 5 is a compatibility grid portion of a compatibility result screen.

FIG. 5 is a closer view of the compatibility grid portion of the compatibility result screen 108. Under each device heading in device row 402 are a Series drop-down window 506 and a Version drop-down window 502, respectively. Series may refer to a particular lineage of the selected device if more than one lineage or series is available from the vendor. Version may refer to a firmware or software version installed on the device. When the search results screen is initially generated based on the devices selected by the user, these drop-down windows are automatically set to the series and version of the device selected by the user via product selection screen 302, and the compatibility status graphic symbols 410 reflect the compatibility statuses for the selected devices corresponding to those series and versions. Once the initial compatibility results have been presented to the user, the compatibility result screen 108 allows the user to change one or both of the series or version numbers for any of the selected devices. Changing either of the series or version information will cause the compatibility status information displayed on the compatibility grid 408 to be updated to reflect the modification. That is, changing the series or version numbers will cause the system to retrieve the subset of the compatibility data corresponding to the selected devices and firmware/series selections, and display the retrieved data as updated status indications on the compatibility grid. In this way, the user can easily determine whether changing a series or version for a given device will render that device compatible or incompatible with the other selected devices.

As noted above, the compatibility status information presented via the compatibility result screen 108 is based on the compatibility data set 110 maintained by the cross-product compatibility system. This compatibility information is kept up-to-date in part by product development teams working for the product vendor, who are responsible for developing and testing the devices for both functionality and compatibility with other products. For example, authorized members of the development team responsible for a given product may have write access privileges to the compatibility data set 110, allowing those users to directly modify the compatibility status of a given device (or a given device/series/version combination) relative to one or more other devices based on in-house compatibility testing performed between those devices. In some embodiments, the interface component 214 can, upon verifying the user's write privileges (e.g., based on log-in credentials, biometric verification, etc.), provide a read/write version of the compatibility result screen 108 that allows the user to interact with compatibility grid 408 to add, delete, or modify graphic symbols 410 within selected cells to reflect the verified compatibility statuses between devices. For example, if a product developer has recently verified that a first device (running a particular firmware version) interacts correctly with a second device under all operational conditions, the user can retrieve a compatibility grid including the first and second devices, select the cell corresponding to the cross-reference between the two devices, and insert an appropriate "compatible" graphic symbol 410 in the cell. Alternatively, if the two devices have been found to be non-compatible, the user may place a "non-compatible" symbol in the appropriate cell. Shaded cells representing the cross-reference between the same device cannot be modified and must remain blank.

Figure 6:
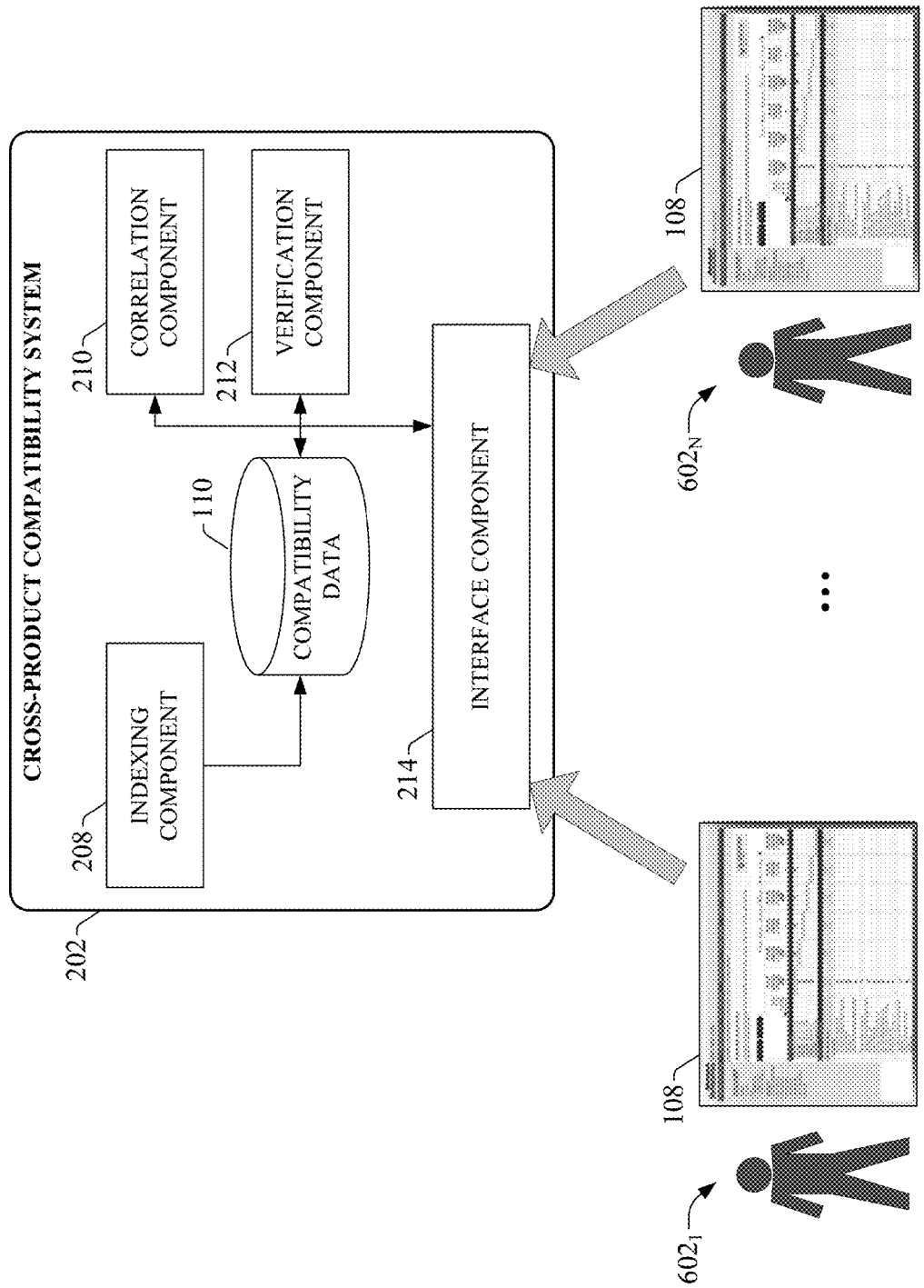
FIG. 6 is a diagram of a cross-product compatibility system that receives compatibility status information from multiple end users to submit compatibility status information to the cross-product compatibility system.

In addition to building the compatibility data set 110 based on in-house product testing, one or more embodiments described herein can also leverage customer experiences with regard to device compatibility by allowing end users to submit compatibility status information to the cross-product compatibility system, as depicted in FIG. 6. Similar to the process described above for receiving vendor-provided compatibility information, authorized end users $602_1$-$602_N$ can submit compatibility status information to the system via interaction with compatibility result screen 108. In an example scenario, selected end users or business entities may enter into an agreement with the product vendor, whereby the vendor confers compatibility system write privileges to the end user. This entails creating a member profile and log-in credentials for the end user or business. Subsequently, if the end user discovers that two particular devices installed on their industrial system are compatible or non-compatible based on their own on-site testing, the user can access the cross-product compatibility system 202 (e.g., via the Internet) and invoke a member sign-in screen 102 (see FIG. 1) to facilitate logging into the cross-product compatibility system with write privileges. Verification component 212 can verify the user's credentials based on log-in information provided via the sign-in screen 102. Once verified, the system allows the user to interact with the product selection screen 302 and compatibility result screen 108 as described above, while also allowing the user to interact with the compatibility grid 408 to enter compatibility status information for selected device combinations.

The cross-product compatibility system 202 can be configured to process compatibility feedback provided by an end user differently than compatibility data entered by in-house product developers. For example, since compatibility information provided by an end user or customer may not necessarily be verified by the product vendor, the system may use different sets of graphic symbols 410 for end user-provided compatibility feedback and vendor-provided compatibility information, so that viewers of the compatibility grid 408 can infer a reasonable degree of certainty that should be applied to the compatibility information. In an example configuration, a "compatible" graphic symbol for a pair of products may comprise a first shade of green if the compatibility status was provided by the product vendor, and a second shade of green if the compatibility status was reported by an end user. In general, compatibility status information provided by an end user is generally less definitive or certain (by virtue of not yet being directly verified by the vendor) than compatibility status information provided by the device vendor. However, viewers of the compatibility grid 408 may nevertheless choose to integrate two devices into their own automation system given the feedback from one or more other customers that the device combination works correctly with no compatibility issues. Moreover, since only end users with membership privileges are given write access to the compatibility system, the degree of certainty associated with end user-provided compatibility feedback can be increased by limiting membership to those end users who satisfy defined trust-based qualifications, which may be based on such qualifiers as the size of the end user's business, the number of years in business, whether the end user has demonstrated that sufficiently stringent engineering standards and practices are in place and consistently followed, etc.

Figure 7:
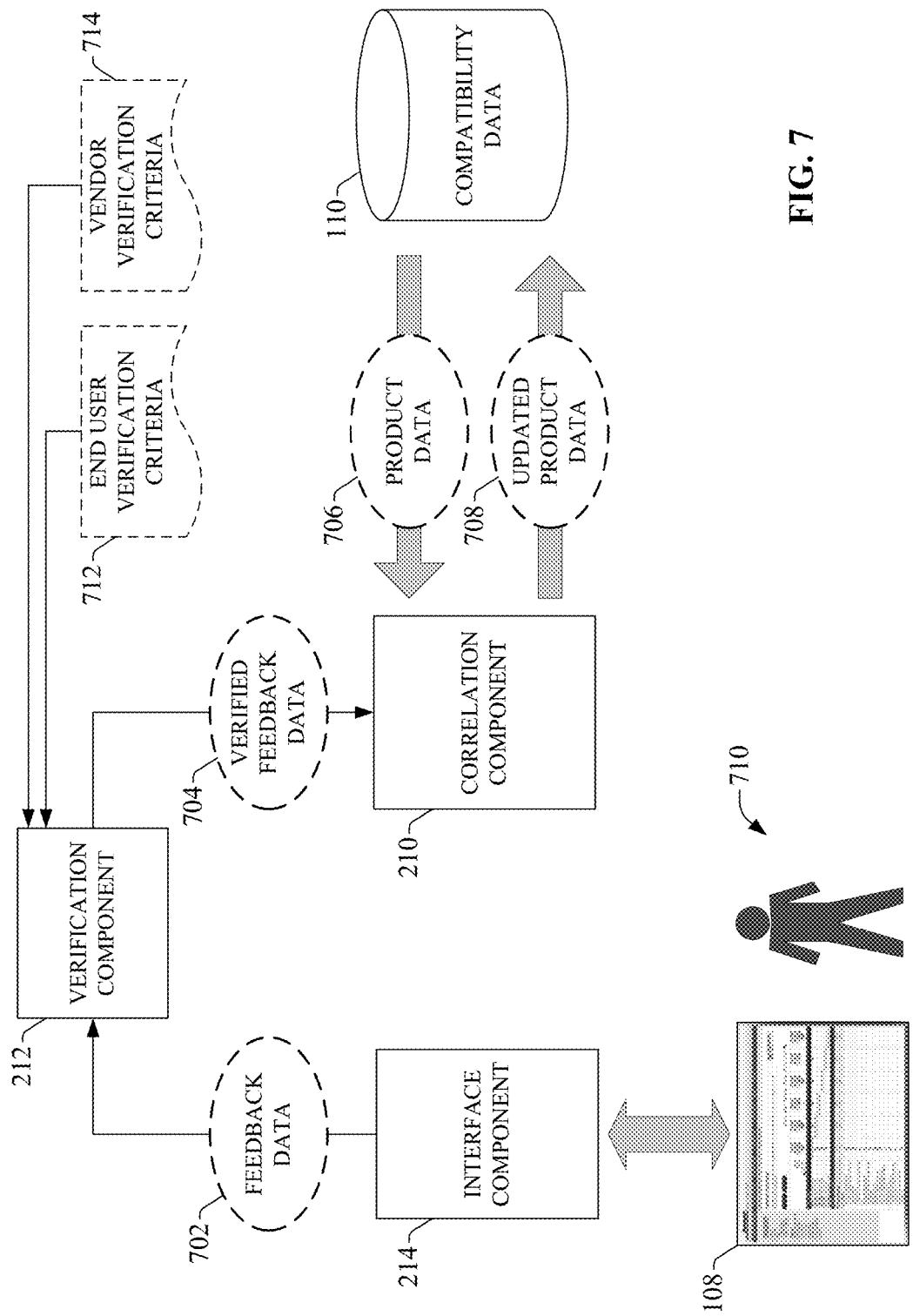
FIG. 7 is a diagram illustrating verification of compatibility feedback data by a cross-product compatibility system.

Verification component 212 can also be configured to apply greater restrictions or conditions on data entered by an end user relative to vendor-provided information. FIG. 7 is a diagram illustrating verification of compatibility feedback data by the cross-product compatibility system 202. As described in previous examples, interface component 214 delivers a compatibility result screen 108 to a user's client device in response to a request to compare a selected set of devices for compatibility. The user 710, who may be a representative of a product vendor or may be an end user associated with an industrial facility, can view the information and (if suitably authorized) enter compatibility feedback data indicating a compatibility or non-compatibility of two devices represented on the compatibility result screen 108.

Interface component 214 can provide this feedback data 702 to verification component 212, which applies one or more verification criteria to the feedback data 702. Examples of the types of verification that can be applied by the verification component 212 will be described below. Verification component 212 may apply different sets of verification criteria to the feedback data 702 based on the type of user (end user or vendor) submitting the feedback data 702. If the submitted feedback data 702 satisfies the verification criteria, verification component 212 will allow correlation component 210 to update the compatibility data set 110 with the verified feedback data 704. That is, correlation component 210 will correlate the verified feedback data 704 with the existing product data 706 maintained in the compatibility data set 110 (e.g., to determine which subsets of the product compatibility information are affected by the newly submitted feedback data) and submit updated product data 708 to the compatibility data set 110 based on the correlation.

In connection with verifying the submitted feedback data 702, the verification component 212 may first identify a role associated with the user 710 submitting the information. The user's role may be obtained, for example, based on log-in credentials submitted by the user when signing onto the system. Based on the determined user role, the verification component 212 will apply either end user verification criteria 712 or vendor verification criteria 714 to the feedback data 702 in order to determine whether to add the data to the compatibility data set 110.

Vendor verification criteria 714 can allow a broader range of date entry permissions relative to end user verification criteria 712. For example, if the user is a vendor representative, the verification component 212 will allow the user to delete or modify a previously submitted compatibility status entry for a given pair of products. If the user is an end user member, end user verification criteria 712 may only allow conditional or partial modifications to be made to existing compatibility status entries. For example, end user verification criteria 712 may prevent end users from modifying compatibility status indicators that had been entered by the vendor. If the end user attempts to modify a compatibility status indicator that had been entered by another end user (e.g., changing a "compatible" status indicator to " non-compatible" or vice versa), the verification component 212 may change the status indicator graphic to a "conflicting report" state indicating that multiple end users have provided feedback regarding the compatibility status of the two devices represented by the indicator, and that the end users have provided both "compatible" and "non-compatible" statuses for the pair of devices.

To provide clarity and context for "conflicting report" status indicators, some embodiments of the cross-product compatibility system can allow end users to enter text-based messages in addition to compatibility status indicators. To this end, when a user enters compatibility status input for a particular pair of devices via the compatibility result screen 108 (e.g., via interaction with compatibility grid 408), the compatibility results screen 108 may prompt the user to enter optional text-based comments, which will be associated with the pair of devices for viewing by other users. Subsequently, when another user performs a compatibility search for that pair of devices, in addition to rendering the compatibility status graphic symbols 410 on the compatibility grid, the system will provide a means to view end user comments tagged to the compatibility status for the device pair. The user-provided comments may, for example, clarify which particular features were determined by the user to be non-operable when the two devices were used together, indicate particular operating modes or conditions in which the devices were found to be non-compatible, recommend techniques for working around or solving compatibility issues that were discovered by the user, recommend firmware upgrades or roll-backs that the end user has found to solve the compatibility issues, or other such information.

In some embodiments, the compatibility result screen 108 may use rating icons with multiple levels to help a viewer to understand compatibility information that has been provided by other end users. For example, a graphical symbol based on user feedback may comprise a color-coded compatibility icon (green for "compatible," yellow for an unsure or intermediate compatibility, and red for "incompatible"), where the compatibility icon also comprises a color-fill indication, where the degree to which the color fills the icon is reflective of the composite user-provided compatibility rating. By this convention, a solidly green status indicator may convey that a majority of users have reported that the corresponding pair of devices work well together with little effort required to make the pair of devices work (an overall "excellent" rating), while a partially filled green icon may convey that a majority of users have reported the device pair to be compatible only after an unexpected amount of effort in configuring the devices for cooperative operation (an overall "good" rating). As an example of the later scenario, users may have found that the pair of devices will only operate together when a particular low-level or secondary configuration parameter has been set, which may not be an obvious step of the configuration process. Similarly, a solidly red icon may indicate that a majority of users have reported the device pair as being non-compatible under all circumstances (an "unacceptable" rating), while a partially filled red icon may convey that a smaller majority of users have reported the device pair as being incompatible in all but a small number of specific usage scenarios (a "poor" rating).

A similar tiered icon can be used to convey a general number of end user control systems that currently incorporate the two devices. For example, in addition to the compatibility icon, a cell of the compatibility grid corresponding to a pair of devices may also include a "number of systems" icon that uses a fill level to indicate a general number of systems in which the device pair is being used. The number of systems in which the pair of devices is being used can be determined based on system audits performed by end users or vendor representatives (the results of which can be entered into the compatibility system), or can be based on automatic end user system audits performed by the compatibility system. Such automated system audits will be described in more detail below.

In some embodiments, verification component 212 can also be configured to audit end user-provided comments prior to making those comments publicly viewable. This can include, for example, confirming that the comments are relevant to the two devices to which the comments will be tagged, verifying that the comments are free of derogatory or offensive commentary, verifying that the comments satisfy a defined level of comprehensibility (including verifying grammar and spelling), or performing other such audits. In some embodiments, end user-provided comments may also be passed to comment auditors associated with the product vendor for review prior to posting the comments publicly, such that the comments will only be made public if the comment auditor has indicated that the comment has been verified.

In one or more embodiments, correlation component 210 may be configured to perform an aggregated analysis on all vendor-provided and end-user provided compatibility feedback for each pair of devices for which compatibility information has been collected and generate a composite compatibility status for the device pair that indicates both an overall compatibility determination (e.g., Compatible, Non-Compatible, or Partially Compatible) as well as a degree of certainty associated with the overall compatibility determination (e.g., high, moderate, or low certainty). In such embodiments, the correlation component 210 can employ any suitable algorithm for determining the compatibility status and degree of certainty. For example, the correlation component 210 may apply a higher mathematical weight to vendor-provided compatibility status information than to end user-provided compatibility information when determining the compatibility status and associated certainty. The correlation component 210 may also base the compatibility determination and certainty on the ratio of received "compatible" indications to received "non-compatible" determinations (where the ratio may be modified based on the vendor-provided compatibility indication, such that the vendor-provided feedback is given greater weight than any given end user-provided status indication).

The degree of certainty associated with a compatibility status indication may be conveyed to viewers of the compatibility grid using color-codes or shading. For example, a dark green graphic symbol 410 may convey a high degree of certainty that the associated device pair is compatible, an intermediately toned green indicator may indicate a moderate degree of certainty that the device pair is compatible, while a light green indicator may convey a low degree of certainty that the device pair is compatible. Similar shadings of red may be used to convey the respective degrees of certainty that the device pair is non-compatible. A yellow indication may convey that the device pair is partially compatible; e.g., that some subset of features are operational when the devices are used together while other features are not, or that the device pair is compatible only under certain operating modes. Tagged comments associated with a yellow indicator may indicate which features or modes have been determined to work for that device pair.

By crowd-sourcing the collection of device compatibility information in this manner, the cross-product compatibility system 202 can more quickly build an accurate and comprehensive set of device compatibility information relative to relying on in-house vendor product testing alone. Since the large number of device combinations in use across many industrial facilities is potentially greater than the number of device combinations that can feasibly be tested at the vendor facilities, the compatibility status data generated by end users in the course of installing, testing, and running their own (often unique) industrial systems can supplement the results of in-house vendor compatibility testing, resulting in a more comprehensive and expansive set of device compatibility information, which can then be shared among all users of the compatibility system 202.

In addition to vendor-provided and end user-provided compatibility status information, some embodiments of the cross-product compatibility system can also be configured to automatically retrieve system configuration information from an end user's industrial automation systems and infer device compatibility information based on this retrieved system configuration information. To this end, the system may include an indexing system configured to remotely examine devices at a customer's plant facility, discover relevant system configuration information, and return this information to the correlation component 210 for integration into the compatibility data set 110. In some embodiments, the indexing system can deploy a discovery agent on the plant network. The discovery agent may comprise, for example, a software script that crawls the customer's plant network to discover industrial devices and other data sources—both internal to the plant as well as external sources—containing available data items that may be relevant in connection with determining device compatibility. The discovery agent can report the discovered data items to the indexing system, which converts the data to a format that can be analyzed by correlation component 210. The correlation component 210 can then analyze the data and identify relevant device correlations or interdependencies contained in the data, generate device compatibility information based on the analysis, and integrate the discovered compatibility information into the compatibility data set 110 for subsequent searching and retrieval. In another scenario, some industrial devices compatible with the indexing system may push their system configuration information to the compatibility system for analysis and indexing.

Remote access to a customer's industrial system by the cross-product compatibility system 202 can be made contingent on the customer's permission. In this regard, the administrator of the cross-product compatibility system 202 may offer incentives to the customer in exchange for allowing the indexing system to access their system configuration information. Such incentives may include, for example, access to the compatibility data system, notification services that inform the customer when new device model or firmware versions are available for their system devices (based on analysis of the system configuration information collected by the system), optimization services that generate and deliver recommendations for improving operation of their industrial systems (e.g., recommending software or firmware upgrades or roll-backs that will unlock additional features of certain devices or device combinations), or other such incentives.

Figure 8:
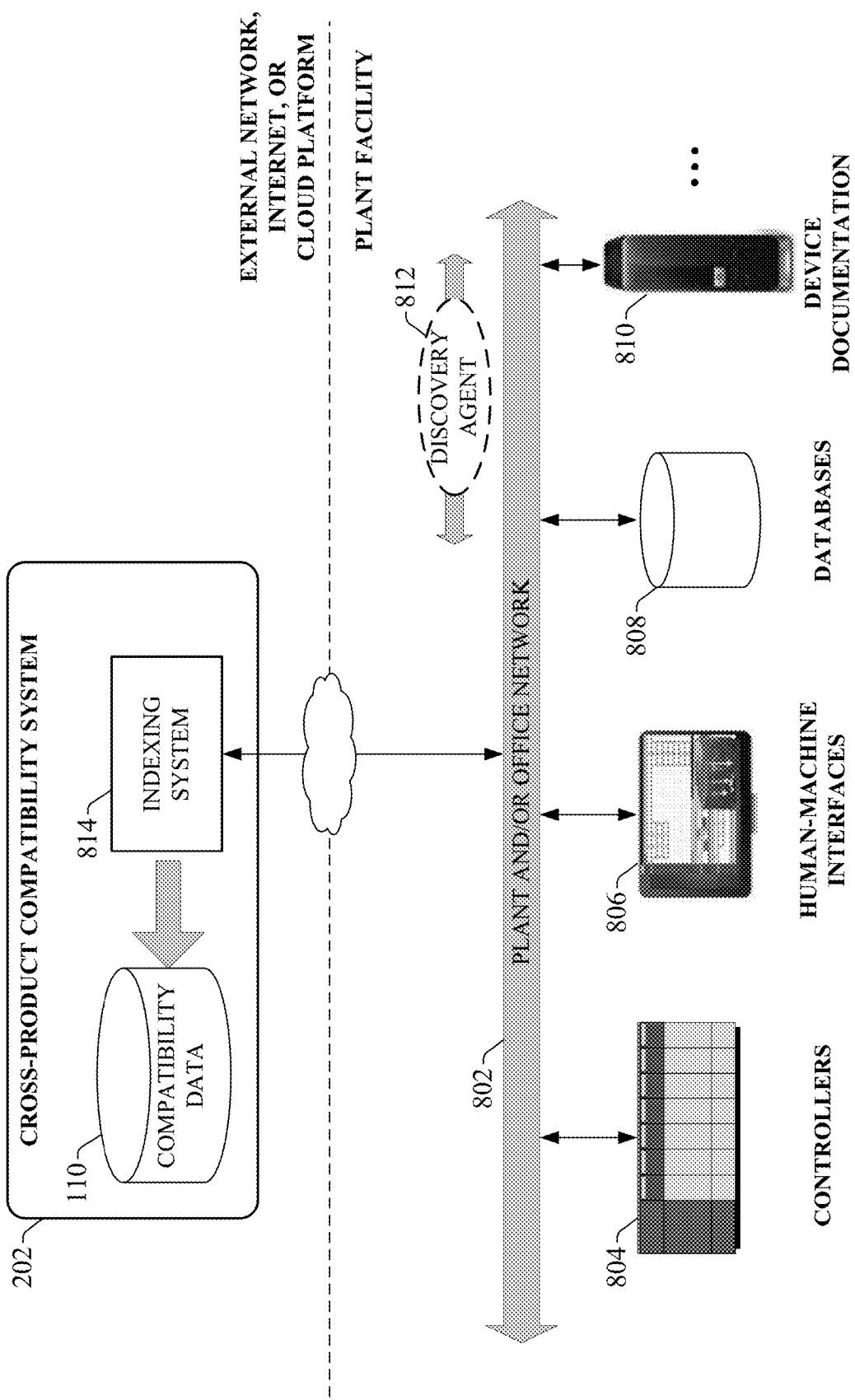
FIG. 8 is a diagram of a generalized example architecture including a cross-product compatibility system that uses an indexing system to discover and index system configuration data throughout an industrial environment.

FIG. 8 is a block diagram of a generalized example architecture including a cross-product compatibility system 202 that uses an indexing system 814 to discover and index system configuration data throughout an industrial environment. The example industrial environment depicted in FIG. 8 includes one or more industrial controllers 804, HMIs 806, databases 808 (e.g., data historians, employee databases, inventory databases, etc.), and device documentation repositories 810. The industrial environment may also include other sources of industrial data not depicted in FIG. 8, including but not limited to product inventory tracking systems, work order management systems, etc. Data sources 804-810 reside on a plant and/or office network 802. In some scenarios, data sources 804-810 may be distributed across multiple networks within the plant facility; e.g., a plant network and an office network communicatively connected through a firewall device or other network infrastructure device. Network 802 may also have access to external networks such as the Internet (e.g., via a firewall).

In this example, cross-product compatibility system 202 resides on an external network relative to the plant and/or office network 802; e.g., at a remote vendor facility, on a web server accessible via the Internet, on a cloud platform, or on another external network. Indexing system 814 discovers and indexes data items that are available in the disparate data sources 804-810. In particular, indexing system 814 can search for available system configuration information programmed on the customer's industrial controllers and/or HMI 806, or documented in the databases 808 or device documentation repositories 810. Based on the discovered configuration information, the indexing system 814 can identify other devices and products with which a given device is configured to interact. The indexing system can then determine other relevant information about those other devices—e.g., product series, software or firmware versions, etc.—either based on further examination of the device configuration information or by examining the configuration information of the other devices themselves if such information is accessible. The cross-product compatibility system 202 will assume at least a degree of compatibility between the devices based on this analysis of the configuration information.

Figure 9:
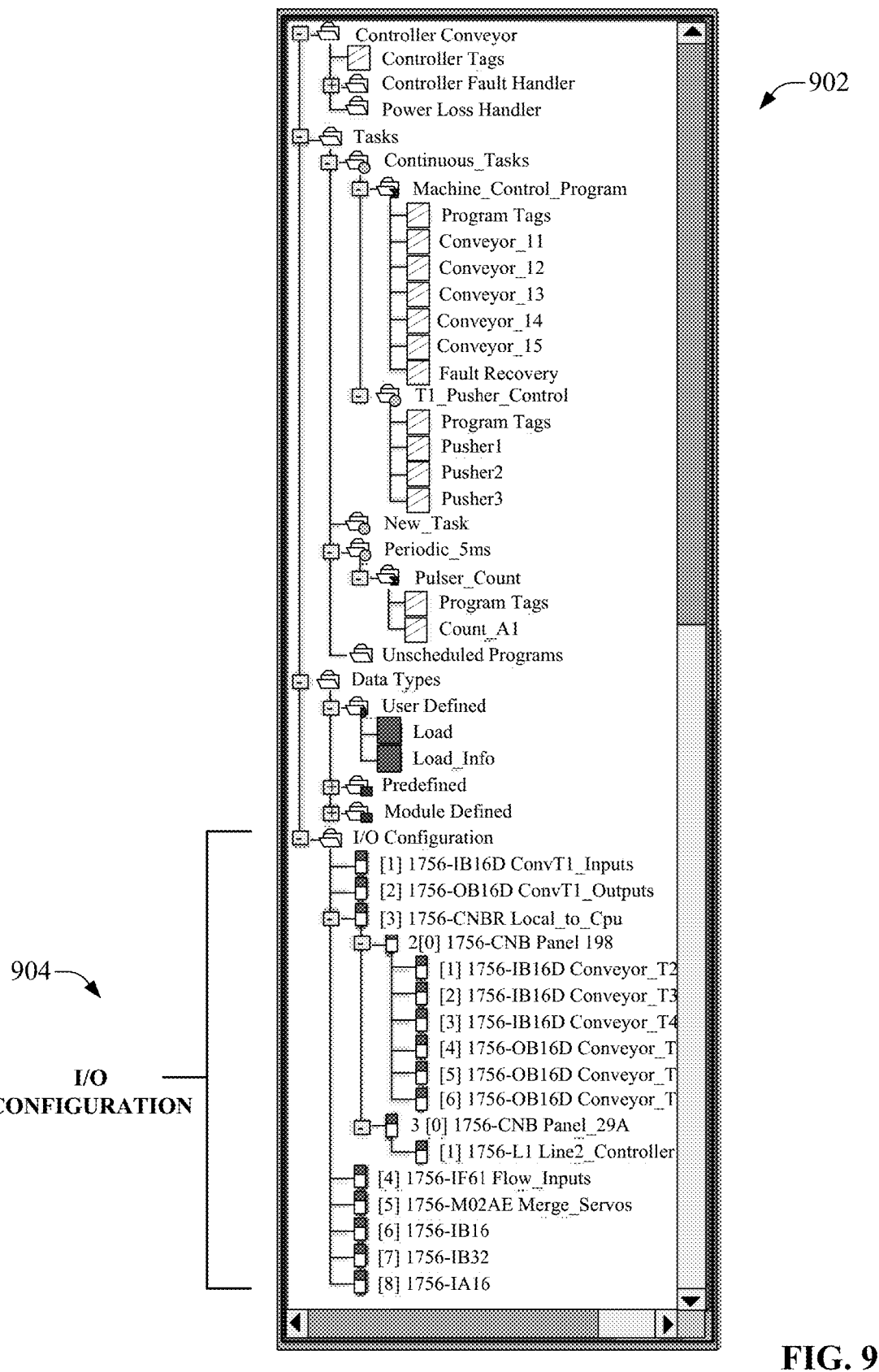
FIG. 9 is an example system configuration view for an industrial controller illustrating types of information that can be obtained by the indexing system in connection with ascertaining device compatibility information.

FIG. 9 is an example system configuration view for an industrial controller illustrating types of information that can be obtained by the indexing system 814 in connection with ascertaining device compatibility information. This example system configuration view—formatted as a system configuration tree 902—represents the view generated by a program development application used to configure and program the industrial controller. As shown in this view, the system configuration tree includes an I/O Configuration section 904 that identifies the I/O modules configured for use with the industrial controller. The I/O modules listed in the I/O Configuration section 904 reflect the I/O modules that have been either manually configured by the user for operation in the controller, or automatically detected by the controller as being installed in the respective slots of the controller's backplane.

Figure 10:
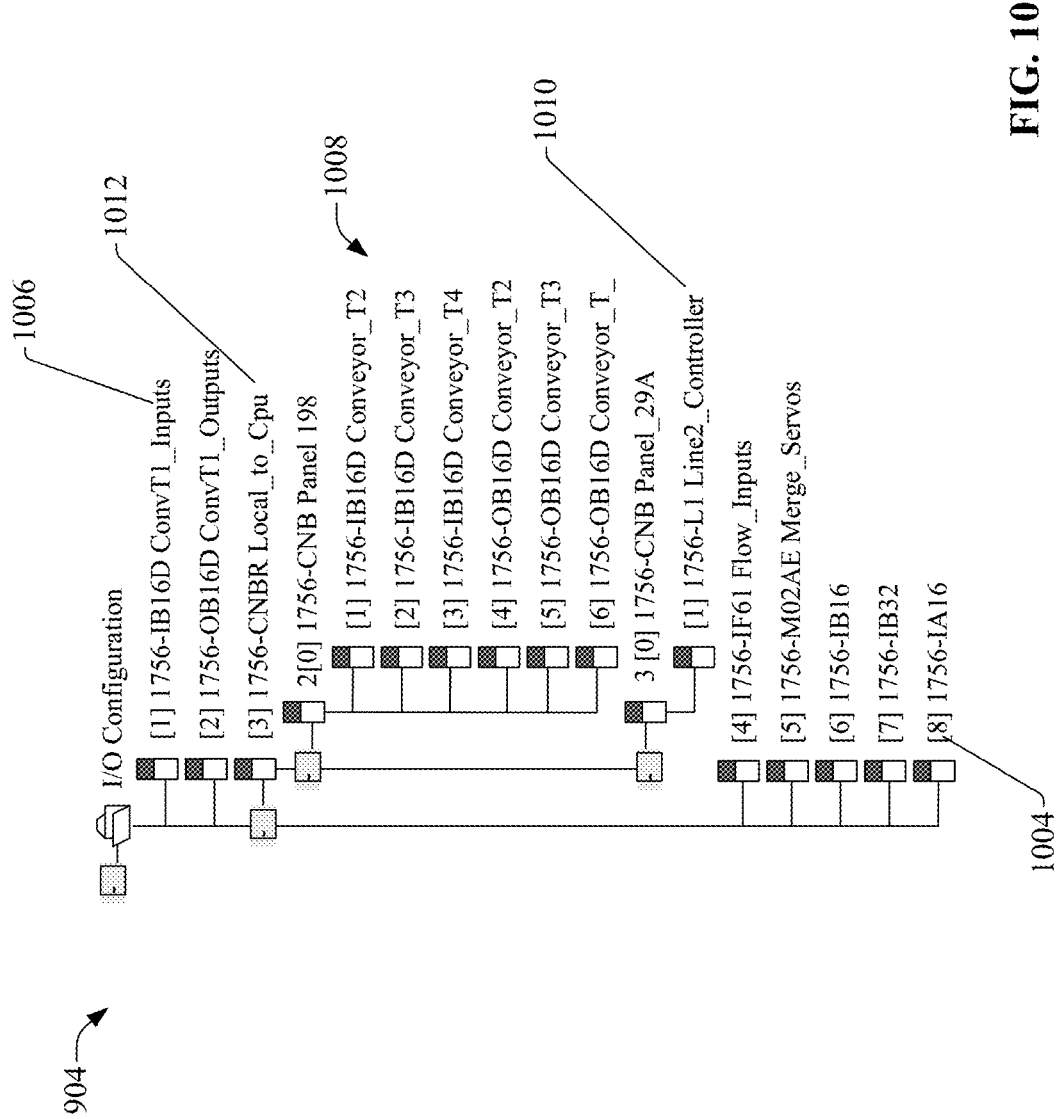
FIG. 10 is an example I/O Configuration section of a device configuration display of an industrial controller.

FIG. 10 is a closer view of an example I/O Configuration section 904. Under the "I/O Configuration" tree header, each I/O module type 1006 configured for the industrial controller is identified by model number and brief descriptive name. The controller rack slot into which each I/O module is installed is indicated by the bracketed slot numbers 1004.

The I/O modules may comprise any combination of digital or analog input or output modules, network modules, motor drive interface modules, or any other type of special function modules. In the illustrated example, slot [3] of the industrial controller is occupied by a network module 1012 (1756-CNBR), which is configured to network six remote I/O modules 1008 (identified as slots [1]-[6] under the network module 1012) to the controller. The network module 1012 is also configured to interface the industrial controller to another industrial controller 1010 (1756-L1), which controls a different production line and which shares data with the local industrial controller.

Figure 11:
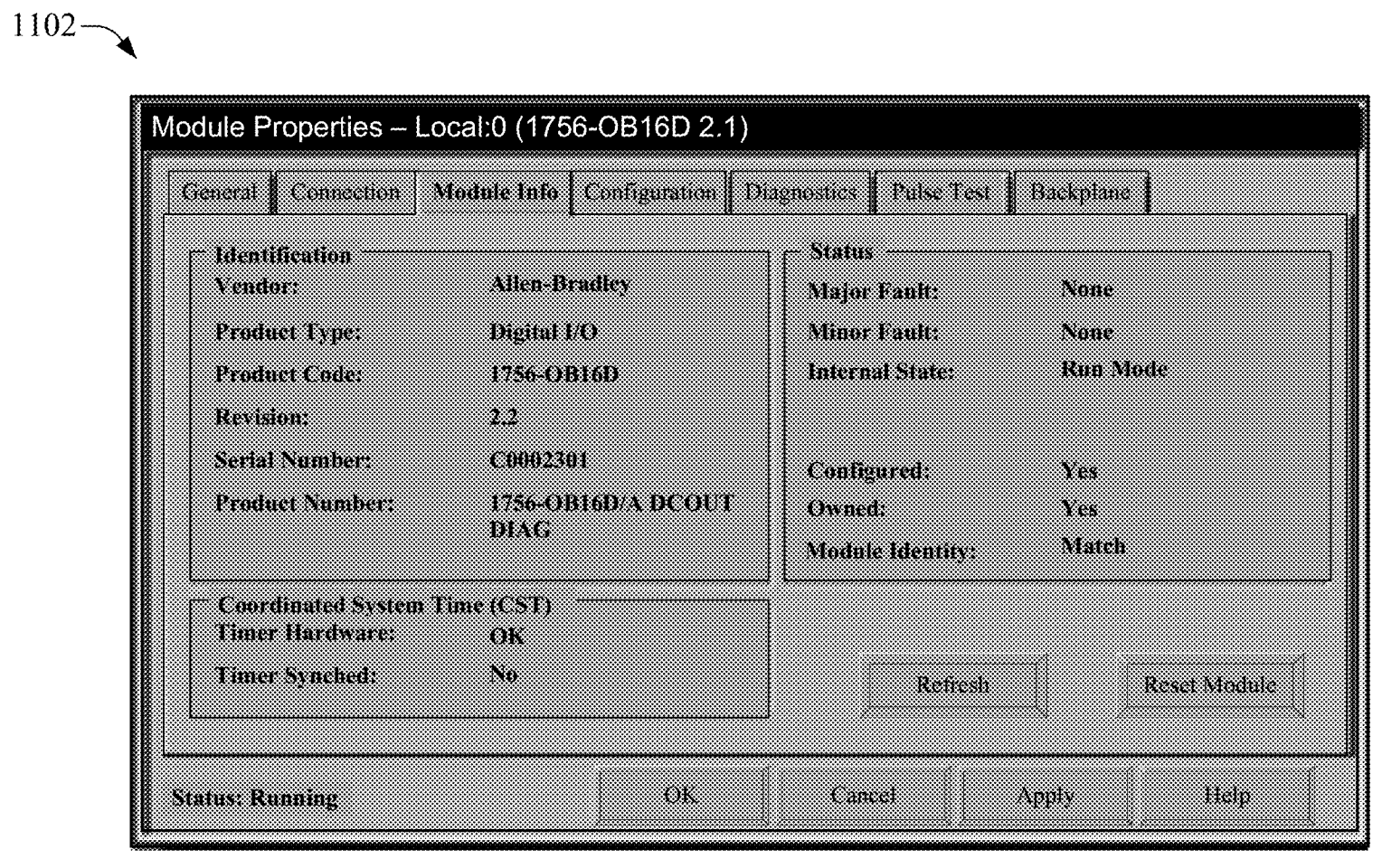

If additional information about the I/O modules configured for use on the industrial controller is available, the indexing system 814 can discover and collect this module-level information as well. FIG. 11 is an example module properties window 1102 illustrating the types of module-level information that can be discovered and indexed by the indexing system 814. The example module properties window 1102 represents the view provided by the program development application used to configure and program the industrial controller, and may be invoked, for example, by selecting an I/O module of interest on the I/O configuration section 904. As shown in this module properties window, the industrial controller can include, for each configured I/O module, information identifying the vendor, product type (e.g., digital I/O, analog I/O, communications, etc.), product code or model number, firmware revision, serial number, and product number. The controller may also include current status information for each I/O module, including but not limited to major and minor fault identifiers (e.g., a fault code of an active module fault), an internal state of the module (e.g., running, idle, faulted, etc.), an indication of whether the module is configured and owned by a master device, an indication of whether the detected module identity matches the module identity configured in the I/O module configuration tree, or other such information. It is to be appreciated that the system configuration information capable of being detected and obtained by indexing system 814 is not limited to the data items described above in connection with FIGS. 9-11, and that different controllers may provide different types of system configuration information that can be discovered and retrieved by indexing system 814 in connection with inferring device compatibilities.

In one or more embodiments, the compatibility system 202 can leverage the customer-level system configuration information discovered by the indexing system 814 to learn device compatibilities, and update the compatibility data set 110 accordingly. For example, based on the fact that the identified I/O modules are configured for use with the industrial controller and do not report fault statuses, the compatibility system 202 can infer at least a degree of compatibility between each I/O module and the industrial controller. The compatibility system 202 may determine a degree of certainty to be associated with a learned compatibility between a given pair of devices based on the number of different customer-specific industrial systems on which this device pair has been discovered. The compatibility system may also discover, based on the system configuration information, that network module 1012 is compatible with all devices configured to communicate with that module (e.g., the remote I/O modules 1008 and remote industrial controller 1010).

Returning now to FIG. 8, to facilitate discovery and indexing of this system configuration data, the indexing system 814 can deploy a discovery agent 812 on the plant network 802, which traverses the network and discovers data sources (e.g., industrial devices, knowledge bases, device documentation storage devices, work schedules, maintenance record databases, electronic communication records, etc.) and the data items (e.g., system configuration information or other relevant data items) available on each data source. In some embodiments, the discovery agent 812 can also traverse external networks to discover relevant external sources of data, including but not limited to vendor websites or knowledgebases. The discover agent 812 can return information describing the discovered data to the indexing system 814 for processing and integration into the compatibility data set 110. In this way, the indexing component 208 automatically inventories a customer's industrial environment by discovering the industrial assets in use, the available data items associated with the respective assets, and the relationships between the assets. Indexing system 814 can also discover relevant data on data sources residing on the external networks, including but not limited to device or machine vendor documentation, relevant online knowledgebase articles, vendor product release information, etc.

Figure 12:
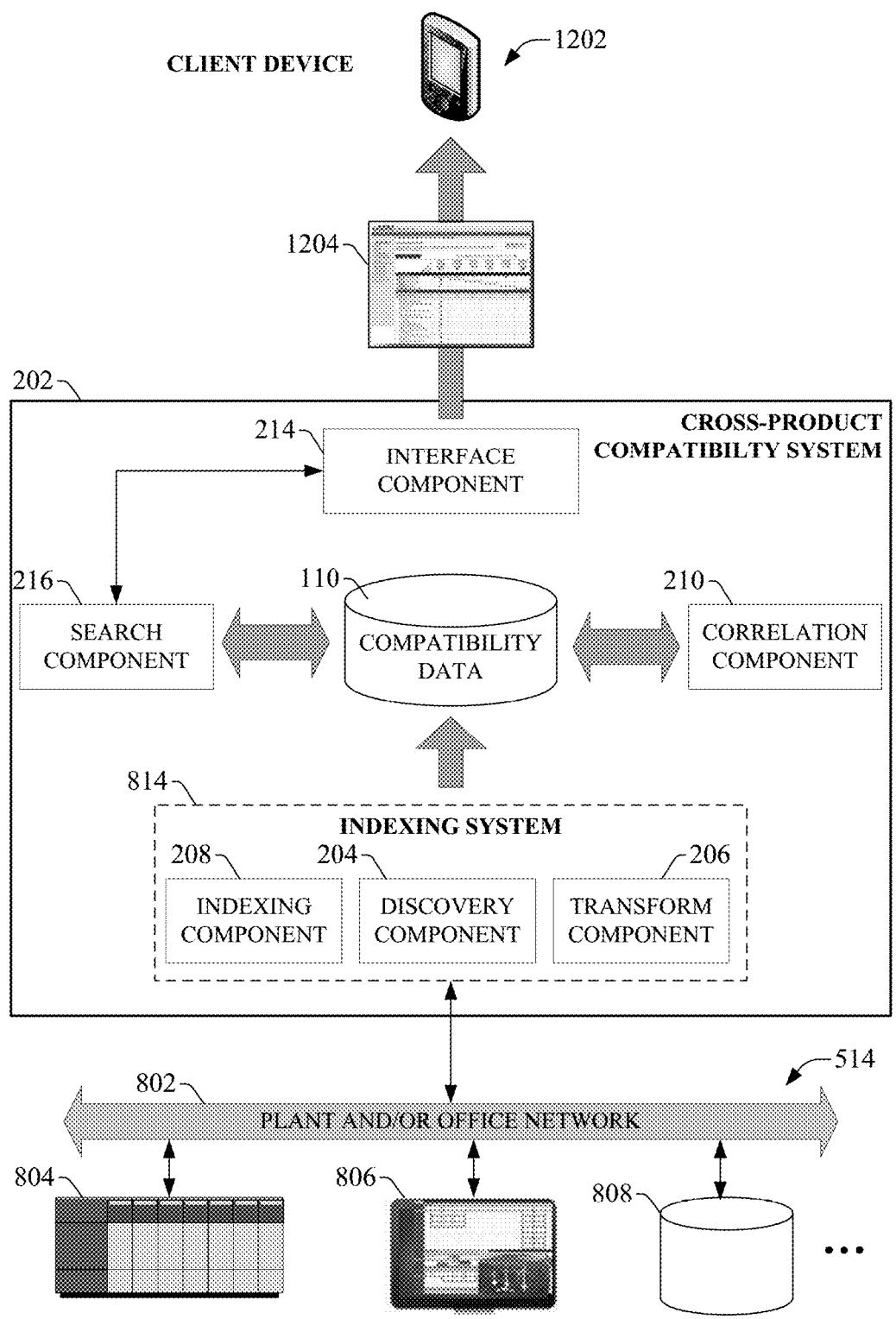
FIG. 12 is a diagram illustrating components of a compatibility system including indexing system.

FIG. 12 is a block diagram illustrating components of the compatibility system 202 including indexing system 814 in more detail. In some embodiments, the cross-product compatibility system 202 may be implemented on a web server, allowing client devices to remotely access the compatibility data set 110 via a web connection, as described in previous examples. In other embodiments, the compatibility system 202 may be implemented as a cloud-based service that executes on a cloud platform. In yet another example configuration, the cross-product compatibility system 202 may be implemented on a server or other computing device that resides on plant and/or office network 802 if the compatibility system is only to be used internally at the plant facility.

Indexing system 814—comprising discovery component 204, transform component 206, and indexing component 208—collects information about available data items distributed across a customer's industrial environment, and in particular searches for system configuration information residing on industrial control devices or other data repositories that may be used to discover or infer device compatibility information. The indexing system 814 is configured to discover data items on multiple disparate platforms, including but not limited to industrial controllers 804, HMIs 806, databases 808, electronic documentation libraries, etc. As will be described in more detail herein, the indexing system 814 can discover available data items by deploying discovery agents 812 on network 802. These agents traverse network 802 and identify devices in use throughout the plant, as well as the data items or tags, applications, and configuration information associated with those devices. Since a given industrial environment typically comprises a heterogeneous collection of devices of different types and vendors, and the data made available by these devices may comprise many different data types (e.g., device or system configuration files of different file types, controller tags, HMI tags, data values, tabular data, logs, parameter settings, diagnostic values, alarms, HTML pages, etc.), indexing system 814 can manage and deploy device-specific or platform-specific agents configured to extract and analyze information from specific types of devices or data platforms (e.g., controllers, HMIs, etc.). Some device-specific discovery agents can be configured to locate application project files stored on particular device types (e.g., configuration and/or program files on an industrial controller, screen configuration files on an HMI, etc.), and extract relevant information about the devices and their relationships to other devices based on analysis of data contained in these project files. By leveraging device-specific and platform-specific agents, the indexing system 814 can discover and index compatibility information based on data conforming to many different formats and platforms.

In order to unify this disparate heterogeneous data under a common platform for collective analysis, the discovery agents can transform the collected data to a format understandable by the indexing system 814 (e.g., extensible markup language or other format), and the indexing system 814 can index this transformed data using a common indexing format compatible with the common search platform. The indexing system 814 then integrates this normalized representation of the discovered data in the compatibility data set 110 based on product correlation analysis performed by correlation component 210. For example, correlation component 210 can analyze the transformed system configuration information retrieved by the indexing system 814 to identify device models (and associated software or firmware revisions) that are being used interactively within the customers' industrial automation systems, and infer at least a degree of compatibility between these devices. The correlation component 210 can then indicate to the indexing component 208 how the collected data should be integrated into the compatibility data set 110 (e.g., which devices are to have their compatibility statuses updated based on analysis of the collected system configuration information, whether a previous degree of certainty associated with a compatibility status between two devices should be revised upward or downward, etc.). By unifying the distributed data under this unified compatibility search platform, the system can allow client devices to search the device compatibility status information without knowledge of the rules or protocols for reading the various data source platforms (e.g., industrial controllers, HMIs, etc.) from which the compatibility information was obtained. In addition to discovery of devices and their associated configuration data via discovery agents deployed on the plant network, some embodiments of indexing system 814 can also be configured to receive uploaded configuration information from devices that support self-identification functionality, as will be described in more detail herein.

Indexing system 814 can also discover and record relationships—both explicit and inferred—between data items discovered throughout the customer's plant environment. In some embodiments, the indexing system 814 may record these relationships by tagging discovered data items and building portions of the compatibility data set based on these tags, such that related data items share common tags. In some scenarios, these tags may be explicitly defined by a system developer such that the indexing component determines which predefined tags should be applied to newly discovered data items.

Using some or all of these techniques, the indexing system 814 can automatically build a device compatibility model based on information retrieved from multiple customers' industrial environments, including the disparate multi-platform and multi-vendor devices in use throughout each customer's facility, their associated available data items and system configurations, and relationships between these data items.

As described in previous examples, the compatibility data set 110—constructed based on vendor-provided compatibility status information, end user-provided compatibility information, and compatibility information automatically discovered by the indexing system 814—can be searched by search component 216 in accordance with user input received via interface screens 1204 (e.g., product selection screen 302 and compatibility result screen 108) served to a user's client device by interface component 214, which may comprise a wired or wireless network interface, a near-field communication interface, or other such interface suitable for the particular platform on which the compatibility system is implemented. In some embodiments, interface component 214 may be configured to verify an authorization of the client device 1202 to access the compatibility system prior to allowing search queries to be submitted by the client device 1202. Interface component 214 may authenticate the client device or its owner using password verification, biometric identification, cross-referencing an identifier of the client device with a set of known authorized devices, or other such verification techniques. Authentication credentials submitted to the system by the client device via interface screens 1204 may also be used by the system to determine the user's role (e.g., end user, vendor, non-vendor with write privileges to the system, etc.) in connection with determining the scope of read and write access to the compatibility information.

In addition to manually entered search criteria (using the screen interactions described above), some embodiments of the interface component 214 can be configured to translate barcodes or Quick response (QR) codes affixed to devices or machines. For example, a user may scan or photograph a barcode or QR code attached to a device, machine, or product (e.g., a pin-stamped or laser-etched barcode affixed to a workpiece during the production process) using client device 1202, wherein the barcode contains identification information about the associated component. The client device 1202 can then submit identification information extracted from the barcode to the interface component 214 as a compatibility search criterion. In an example scenario, the user may scan a barcode or QR code attached to a first industrial device, which causes the interface component 214 to place the device in the selection window 306 of product selection screen 302. The user may then scan a second industrial device, causing the interface component 214 to add that device to the selection window. With these two products selected, the user can then select the compare button 310 to facilitate retrieval of compatibility status information for the two devices. In some scenarios, barcode or QR code may only convey the model number and series of the device, but not the current firmware revision currently installed on the device (since the firmware may be updated after installation of the device). If the scanned device is a type known to require a firmware installation, the system may prompt the user to select the firmware revision installed on the device (if known) after scanning the device's barcode or QR code. Alternatively, the system may default to a particular firmware revision for the purposes of compatibility comparison, and allow the user to change the firmware revision if necessary (e.g., via interaction with the version drop-down window 502).

In another example, client device 1202 may extract information about an industrial device or its associated process directly from the device via near field communication (NFC) and submit the extracted information to the interface component 214. This extracted information can include, but is not limited to, a device identifier, firmware or software version information, or other such information.

In addition to processing compatibility queries submitted by a user via a client device, some embodiments of the cross-product compatibility system 202 system can also support automated dynamic compatibility checks and related notifications. This dynamic compatibility monitoring can allow the system to, for example, send proactive notifications to customers in response to determining that compatibility information for two devices currently in use in the user's automation system satisfy a defined criterion that merits notifying the user. This notification feature may be offered as an incentive to selected end users in exchange for allowing the indexing system 814 to poll the users' industrial automation systems in connection with building compatibility data set 110, as described above.

For embodiments that support dynamic compatibility monitoring and notification, the indexing system 814 can leverage the system configuration information collected from the user's industrial automation systems to not only update the compatibility data set 110, but also to build a customer-specific model of the user's industrial assets and the functional relationships between these assets. This model can be stored by the system 202 in association with a unique customer identifier, and informs the system of the industrial devices in use at the customer's facility, and which of those devices operatively interact with one another. Based on this model, the search component 216 can identify which subsets of compatibility information maintained in compatibility data set 110 should be monitored on behalf of that customer. For example, if the customer's system configuration information indicates that a particular model of industrial controller is being used with a particular I/O module, the dynamic search capabilities of search component 216 will monitor the compatibility status information for that pair of devices in connection with providing compatibility update notifications to the user. Subsequently, if the search component 216 determines that the compatibility information for that pair of devices has been updated, the system determines whether the update satisfies a condition that merits delivery of a notification to one or more specified users associated with the facility.

For example, if the compatibility data set 110 is updated to indicate that a new firmware revision applied to the industrial controller causes compatibility issues with the I/O module (e.g., based on new information submitted to the system by the device vendor or another end user), the search component 216 can instruct the interface component 214 to deliver a notification to one or more client devices associated with appropriate plant personnel informing that upgrading the firmware on the industrial controller may cause compatibility issues with the I/O module. The notification can include an identification of the firmware revision known to cause compatibility problems, and a list of firmware revisions known to be compatible with the I/O modules. In another example, the search component 216 may determine that the compatibility status information for the controller and I/O module has been updated to indicate that a particular firmware version for the industrial controller will open additional functionality between the controller and the I/O module. Accordingly, in response to this determination, the interface component 214 will send a notification to the one or more appropriate client devices informing the users of the advantage of installing that firmware version on their industrial controller. Users to be included on the notification list, as well as their preferred methods for receiving compatibility notifications, can be defined in association with the customer identifier.

Figure 13:
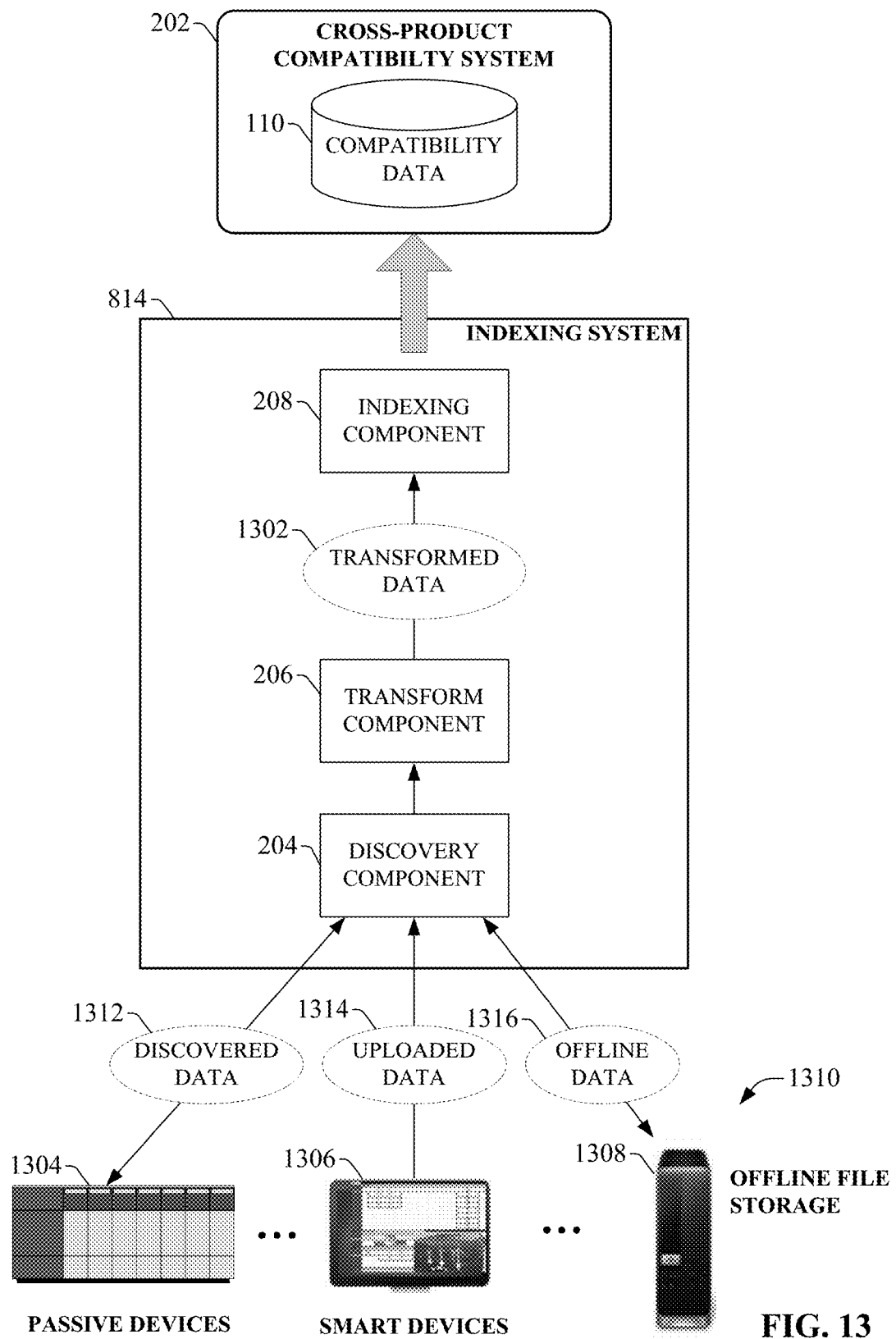
FIG. 13 is a diagram that illustrates processing performed by an industrial data indexing system in connection with collecting a customer's system configuration information.

FIG. 13 is a block diagram that illustrates processing performed by the indexing system 814 in connection with collecting a customer's system configuration information. A given industrial environment may comprise a diverse, heterogeneous set of data sources 1310. In order to unify the data available on these sources under a common namespace for indexing and search purposes, the discovery component 204 can be configured to discover data in a number of ways. Some devices within the plant environment may be passive devices 1304, which only provide information regarding their available data items in response to a request from the discovery component 204 of the indexing system 814. Such a request may be initiated by the discovery agent 812 (see FIG. 8).

In an example scenario, when the discovery agent 204 discovers a new data source during traversal of the plant network, the agent will examine the data source to identify system configuration information or other data items on that device that are eligible for indexing in the compatibility data set 110. If the discovered data source is an industrial controller, for example, the available data items may comprise the industrial controller's digital product signature (indicating the device's vendor, model, series, serial number, product number, or other such identification information), program information, I/O configuration settings and statuses (e.g., the configuration settings and module statuses described above in connection with FIGS. 9-11), firmware or software versions currently installed on the controller, devices that are configured to exchange data with the controller over a network, data tags or registers defined by the industrial controller's configuration and programming file, or other such information.

In another example, the discovered data source may be an interface terminal executing an HMI application for visualizing a controlled process. In this scenario, the discovery agent may identify the terminal and proceed to scan the configuration settings for the HMI application, which may indicate the devices or other data sources communicatively interface with the HMI (e.g., a networked industrial controller with which the HMI exchanges data).

The discovery agent 812 can package the information collected as described above—including identities of devices that have been configured to work together, the firmware or software revisions installed on those devices, functions that have been enabled on the respective devices, etc.—and send this information back to the discovery component 204 as discovered data 1312. Since the discovery agent 812 is capable of performing appropriate analysis on a number of different types of data platforms (e.g., industrial controllers, HMIs, device documentation, etc.) in order to identify the data platform and its available data, the discovery agent 812 may pre-format the discovered data 1312 to conform a format compatible with the indexing system 814 prior to returning the discovered data 1312 to the discovery component 204. In this way, the discovery component 204 and its associated discovery agent can automatically normalize heterogeneous data from diverse data formats into a common, homogeneous format that can be collectively processed and indexed by the indexing system 814.

Figure 14:
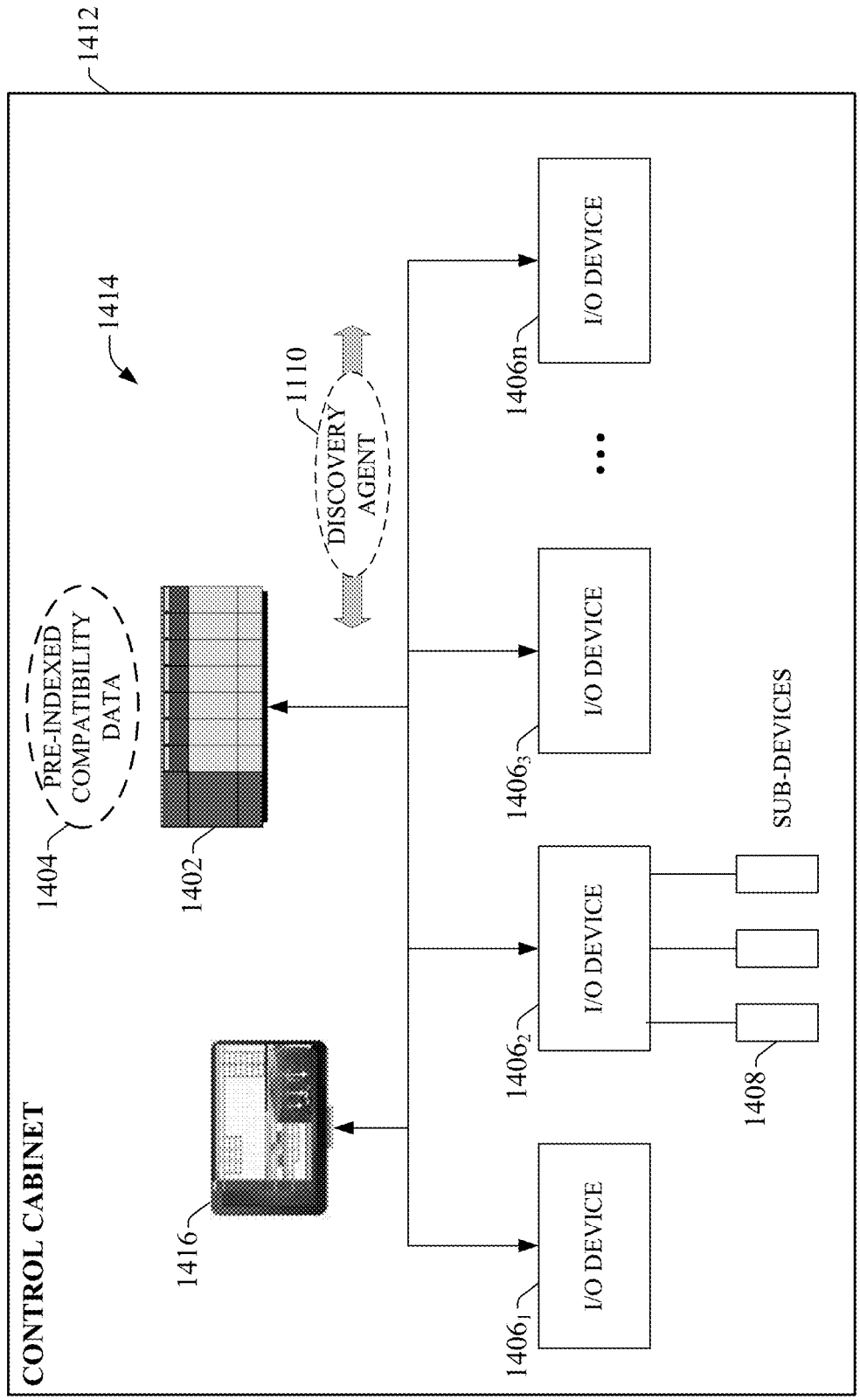
FIG. 14 is a diagram illustrating creation of pre-indexed compatibility data using indexing functionality implemented on an industrial controller.

While the previous examples described the discovery agent as being deployed by a discovery component of a centralized indexing system that is part of a cross-product compatibility system, some sub-systems within a customer's larger plant environment may be pre-discovered prior to deployment within the larger industrial enterprise. For example, in some embodiments the indexing system may be implemented on an industrial device, such as an industrial controller, which deploys a discovery agent to discover devices and data that reside under that device (e.g., devices that are controlled by, or provide data to, the industrial controller), as well as the configurations, data, and interdependencies associated with these devices. FIG. 14 is a diagram illustrating creation of pre-indexed compatibility data 1404 using indexing functionality implemented on an industrial controller 1402. In this example, industrial controller 1402 is mounted in a control cabinet 1412 as part of a control system 1414 to be installed at a plant facility. The control system 1414 is housed in control cabinet 1412, which may have been designed and built by an original equipment manufacturer (OEM), a systems integrator, or other machine builder to fulfill a customer order.

Control system 1414 may comprise a number of I/O devices 1406 (e.g., motor drives, sensors or other telemetry devices, solenoid valves, remote I/O modules, etc.) interfaced with the industrial controller 1402. The I/O devices 1406 may be hardwired to the industrial controller's I/O modules, or may exchange data with the industrial controller 1402 over a local network (e.g., EthernetIP, common industrial protocol, etc.). In addition, one or more of the I/O devices 1406 may have a number of sub-devices 1408 connected thereto. For example, if an I/O device is a remote I/O module, sub-devices 1408 may comprise the I/O devices connected to that remote I/O module. The control cabinet 1412 may also include an HMI terminal 1416 for visualizing the machine or process being controlled by the control system 1414. The HMI terminal 1416 is communicatively connected to the industrial controller 1402 over a local network connection or an interface cable.

In this example, the indexing functionality implemented on industrial controller 1402 can generate its own compatibility data 1404 for delivery to the compatibility system based on its system configuration settings. For example, the industrial controller 1402 can generate the compatibility data 1404 to include its device model, current firmware revision, models of I/O modules configured for use with the industrial controller 1402, I/O devices configured for respective I/O points of the I/O modules, information regarding any devices networked to the industrial controller 1402 (e.g., the HMI terminal 1416), configuration errors associated with any of the configuration settings (e.g., any compatibility error messages associated with any of the I/O module configurations), etc. The indexing system can examine the controller's configuration, tag list, and programming information to identify some or all of the I/O devices 1406 and sub-devices 1408 connected to the controller, as well as functional interdependencies between the components. In some embodiments, the indexing functionality of the industrial controller 1402 can also pre-discover available devices and data within the control cabinet 1412. To this end, the industrial controller 1402 can deploy a discovery agent 1410 on its local network to discover additional devices and available data below the controller level. For example, the discovery agent 1410 can identify the HMI terminal 1416 connected to the industrial controller 1402, and retrieve the model number, firmware revision, and software version for the device. The discovery agent 1410 reports this information to the indexing system on the industrial controller 1402 for indexing.

In a similar fashion, the discovery agent 1410 traverses other accessible devices below the controller level and reports discovered devices and data back to the controller's indexing system. In this regard, some I/O devices 1406—particularly those I/O devices that are hardwired to the industrial controller's I/O modules—may be discoverable without deploying discovery agent 1410 by simply examining the I/O module configuration information defined on the industrial controller, since this I/O module configuration information specifies the devices connected to each point of the I/O modules. For I/O devices that are networked to the industrial controller 1402—which may include devices capable of operating autonomously or semi-autonomously and which may contain additional configuration information not made available to the industrial controller 1402 (e.g., vision systems, barcode stamping systems, barcode reader systems, etc.)—the discovery agent 1410 can discover and analyze these devices and report the available data items back to the controller's indexing system.

Figure 15:
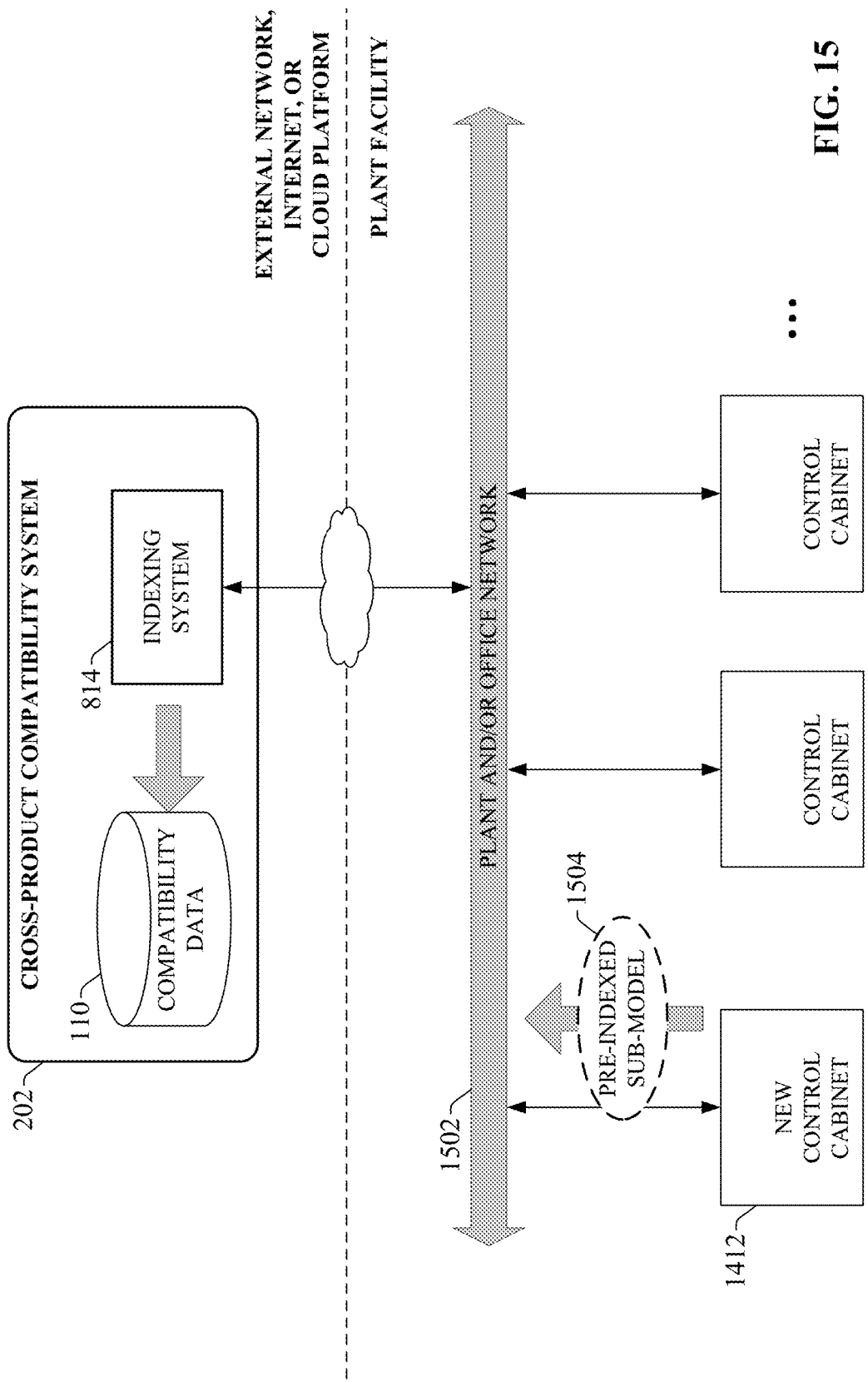
FIG. 15 is a diagram illustrating submission of pre-indexed compatibility data to a cross-product compatibility system by an industrial device residing in a control cabinet.

The industrial controller 1402 leverages the discovered data to generate pre-indexed compatibility data 1404, which represents the control system 1414 and its associated devices. As illustrated in FIG. 15, when the control cabinet 1412 is installed at the customer facility, the industrial controller 1402 establishes communication with the pre-existing cross-product compatibility system 202 over plant network 1502 and sends the pre-indexed compatibility data 1404 to the indexing system 814 for integration with the compatibility data set 110. By implementing an indexing system on an industrial device, a machine builder can provide a machine and associated control system with its available device compatibility information pre-discovered and indexed, which can be quickly integrated with the larger compatibility data set 110 to facilitating updating the publicly available device compatibility information.

Although the example described above in connection with FIGS. 14 and 15 depicts the indexing functionality as being implemented on an industrial controller, this functionality can also be implemented on other control system devices, including but not limited to an HMI, motor drive, or other device.

Figure 16:
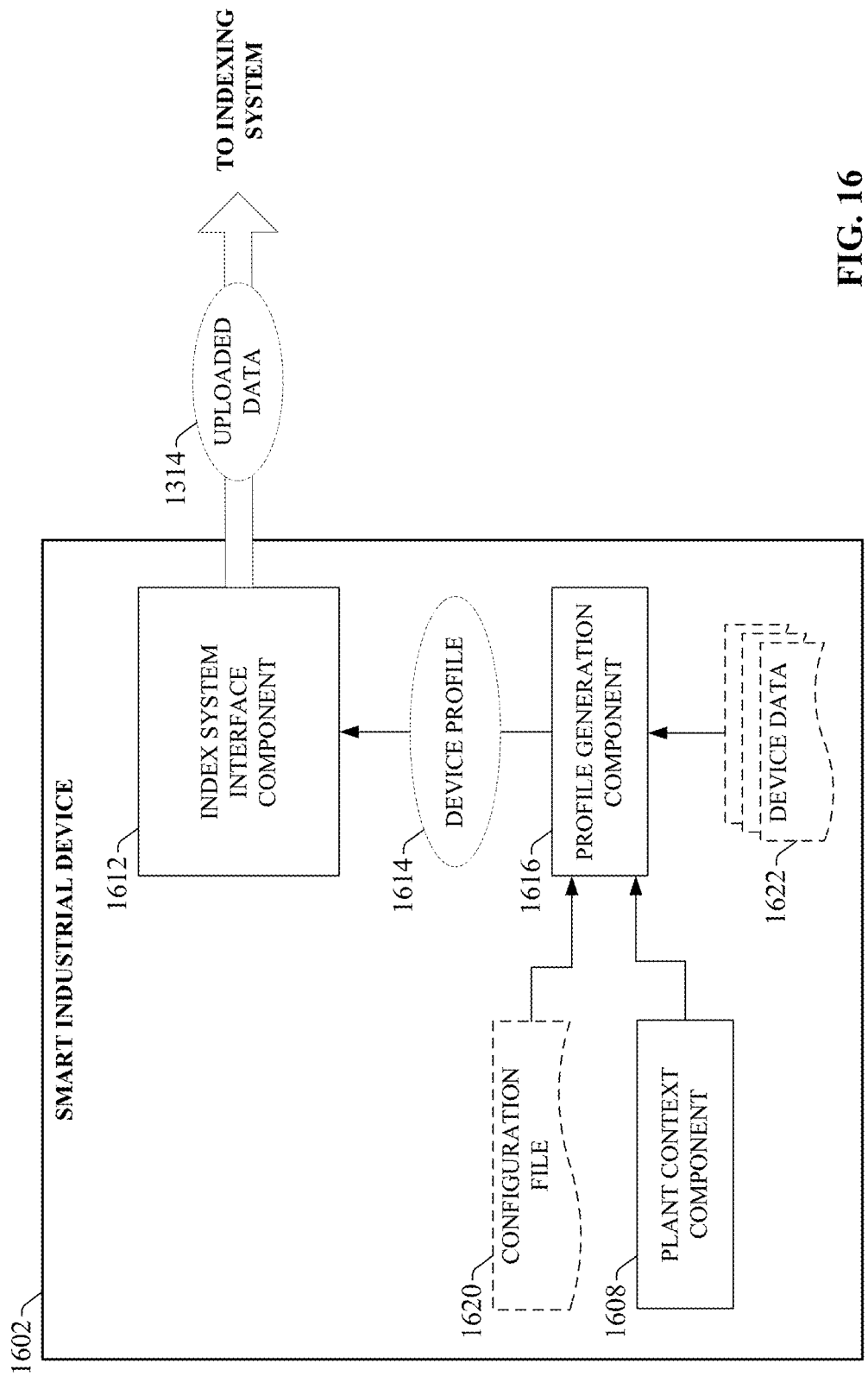
FIG. 16 is a diagram of an example smart device capable of self-reporting to an indexing system.

Returning now to FIG. 13, in addition to passive devices 1304, the industrial environment may include one or more smart devices 1306 having integrated self-reporting functionality. Such devices can provide uploaded data 1314 specifying their identity, configuration, and available data items to the indexing system 814 directly without the need for analysis by a discovery agent. Turning to FIG. 16, an example smart device capable of self-reporting to indexing system 814 is illustrated. Smart device 1602—which may comprise substantially any type of industrial device or data storage unit (e.g., an industrial controller, an HMI terminal, a motor drive, device documentation storage, etc.)—includes an index system interface component 1612 configured to communicatively couple smart device 1602 to the indexing system 814 and exchange data therewith; e.g., via a plant network or over a public network such as the Internet (for configurations in which the indexing system resides on a web server or cloud platform).

When smart device 1602 is installed as part of an industrial automation system, index system interface component 1612 can establish communication with the indexing system 814. In one or more embodiments, the index system interface component 1612 can be configured to auto-discover the indexing system 814. For example, the smart device 1602 may be pre-configured with the identification of the indexing system to which the device is to provide its identity and configuration information (e.g., a name associated with the indexing system, a machine identifier, a cloud or web address, etc.), or may be configured to perform a search of local and remote networks for compatible industrial indexing systems that may be present on the networks. Any suitable handshaking protocol may be used to establish communication between the smart device 1306 and the indexing system.

Upon discovery of the search system, the smart device 1602 can package and send relevant information about the device—including the device's model and series information, current firmware or software revision, devices configured to interface with the device (e.g., I/O modules and devices connected to those I/O modules, networked devices, etc.), or other such information—to the indexing system, which integrates the reported data items into the compatibility data set 110 as described above. In some embodiments, a profile generation component 1616 can generate a device profile 1614 for smart device 1602 to be sent to the indexing system 814 via index system interface component 1612. Device profile 1614 can convey information about smart device 1602, including but not limited to an identity and type of the device, device data 1622 available on the device, a context of the device within the industrial environment (e.g., a relationship of the device to other devices comprising an industrial automation system), any built-in displays or dialog screens (e.g., HTML pages) that provide access to the device's data, etc. In some embodiments, profile generation component 1616 may collect configuration information encoded in a configuration file 1620 stored on the smart device 1602, which may be a control program, a configuration or parameters settings file, an application file (e.g., an HMI application or HTML page), or other such file. The profile generation component 1616 can package this information into a device profile 1614, which is then sent to the indexing system as uploaded data 1314 by index system interface component 1612.

Some embodiments of smart device 1602 may also include a plant context component 1608 configured to collect additional contextual information about the smart device 1602 for delivery to indexing system 814. Plant context component 1608 can determine a context of smart device 1602 within the plant or enterprise environment. For example, one or more embodiments of plant context component 1608 can identify other devices and systems within its local environment and make a determination regarding a location of smart device 1602 within a hierarchical plant context or device topology. Some embodiments of the federated data model may represent a given industrial enterprise in terms of multiple hierarchical levels and device hierarchies, where each level comprises units of the enterprise organized as instances of types and their properties. Plant context component 1608 can gather information that facilitates locating its associated smart device 1602 within an organizational or device hierarchy in a number of ways. In one example, plant context component 1608 can identify a topology of devices sharing a common network with smart device 1602 and interconnections between the devices. For example, if smart device 1602 is an industrial controller, plant context component 1608 can identify one or more discrete or analog I/O devices connected to the controller (e.g. based on a configuration file 1620 that defines the I/O module configurations for the controller). In addition, plant context component 1608 can identify other controllers on the network and their role within the overall industrial enterprise (e.g., the production areas, workcells, or processes associated with the respective controllers). In some embodiments, plant context component 1608 can also determine an identity of a particular network (e.g., a network name) to which smart device 1602 is attached. This information can be leveraged (either by profile generation component 1616 or an external application) to determine the device's location and role within the industrial automation system, since some networks may be dedicated to a particular production area. Some embodiments of plant context component 1608 may also identify a type of machine to which smart device 1306 is connected (e.g., a palletizer, wrapper, conveyor, etc.).

By gathering information about the local device topology, plant context component 1608 can facilitate identifying a location of smart device 1602 within the enterprise hierarchy and a functional relationship between the smart device 1602 and other devices within the enterprise. In some embodiments, this determination of the location within the enterprise hierarchy can be made by plant context component 1608 itself. Alternatively, profile generation component 1616 can include information gathered by plant context component 1608 in device profile 1614 so that the indexing system 814 can accurately represent smart device 1602 within the enterprise or device hierarchy.

Another example smart device may comprise a network infrastructure device—such as an Ethernet switch—configured to monitor traffic on the plant network and discover devices present on the network. For example, based on analysis of the data traffic on the network, the network infrastructure device can identify a device that is the source of the data traffic. Based on network address information for the device extracted from the monitored data, the network infrastructure device will access the device over the network and extract configuration information from the device that may be relevant to device compatibility determination. The infrastructure device can then provide this extracted information to the discovery component 204 for processing and inclusion in the compatibility data set 110. In another example implementation, the network infrastructure device can be configured to identify which devices on the network are communicating with each other based on analysis of the network data traffic. Based on this analysis, the network infrastructure device can generate report data identifying the devices that are interacting with one another. In connection with generating this report, the network infrastructure device can ping the respective devices in order to extract additional information about the devices (e.g., the model or series numbers, software or firmware versions, etc.) and include this extracted device information in the report. The network infrastructure device will then provide this report data to the discovery component for processing.

Returning to FIG. 13, the indexing system 814 may also collect and index offline data about certain industrial devices rather than gather information about the devices directly from the devices themselves. In this regard, some industrial devices may have information about their configuration, programming, and available data items captured and stored as offline files stored on separate offline file storage devices 1308. These offline file storage devices may comprise, for example, asset management systems that store manually-entered system configuration or inventory information for a user's various industrial assets. Accordingly, one or more embodiments of the discovery agent 812 can identify and process these offline files in a similar manner as described above in order to index known compatibility information for these devices in the compatibility data set. For example, documentation for a given device may identify other devices that are compatible with the device. The indexing system 814 can infer compatibility between these devices and the device that is the subject of the documentation, and update the compatibility data set 110 based on this inferred compatibility information.

In another example technique for collecting system configuration information, a cloud- or web-based information collection system can be configured to receive device or system configuration information manually entered by end users. For example, an entity that administers the cross-product compatibility system may incentivize users to provide configuration information for their various industrial assets in exchange for notification services that leverage this configuration information. Such notification services can include, for example, delivery of alert messages when a new firmware version for one of the user's industrial assets becomes available, delivery of recommendations for re-reconfiguring one or more of the user's assets in a manner that may improve performance or functional compatibility between the user's assets, or other such services.

Figure 17:
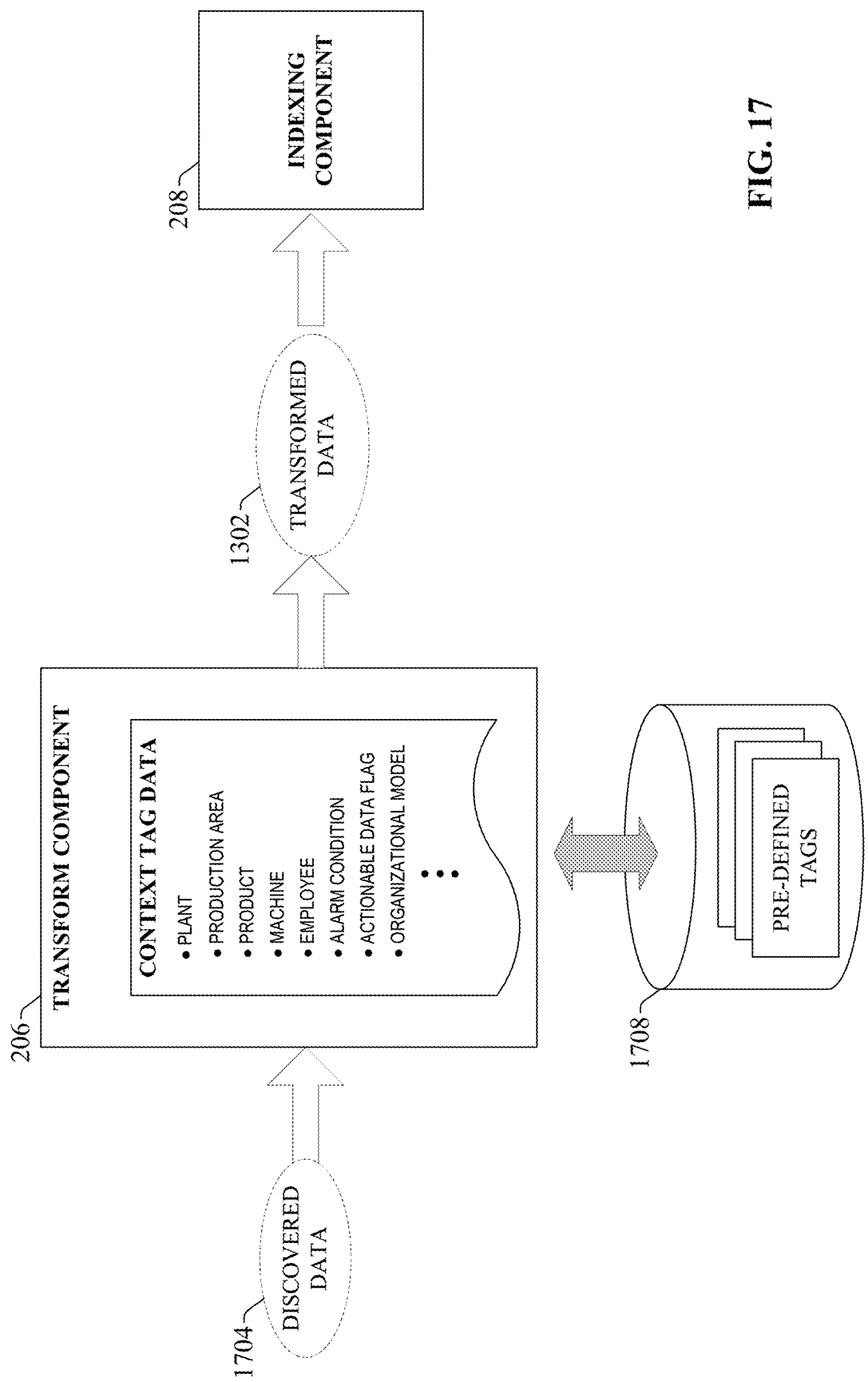
FIG. 17 is a diagram illustrating transformation of discovered data by a transform component.

Transform component 206 can perform any necessary transformation on the data collected by discovery component 204 prior to indexing. This can include, for example, normalizing any data that was not appropriately formatted by the discovery agent 812, so that all collected data accords to a common format usable by the indexing system 814. In some embodiments, transform component 206 can also add contextual data or tags to the collected data items to achieve highly granular indexing for search purposes, as well as to facilitate subsequent discovery of interdependencies between the diverse and plant-wide industrial devices. FIG. 17 is a block diagram illustrating transformation of discovered data 1704 by transform component 206. As noted above, the discovery agent 812 (or discovery component 204) may add some contextual information to the discovered data items prior to sending the data to transform component 206. However, in some cases the transform component 206 may be able to add additional context to this data based on information not available to the discovery agent 812. In other scenarios, the discovery agent 812 may not have been able to contextualize all the discovered data due to limited available information about a given device (e.g., in the case of an older legacy device with limited capabilities).

Contextual data that can be added by transform component 206 for a given data item can include, but is not limited to, an identifier of a plant and/or production area at which the source of the data item resides (e.g., the plant or production area in which the devices identified by the data are located); a machine or product to which the data item relates; one or more employees to be associated with the data item (e.g., based on the production area, shift during which the data item was collected, etc.); a concurrent alarm condition determined to be relevant to compatibility determination; an actionable data flag indicating that the value of the collected data item requires a response from plant personnel; or a tag indicating the location of the data within the context of a hierarchical organizational model of the plant (e.g., in terms of an enterprise level, plant level, work area level, machine level, control level, etc.).

In some embodiments, the transform component 206 can selectively tag discovered data items with one or more pre-defined tags 1708 defined in association with the indexing system 814. These tags may be used to contextualize the discovered data based on one or more user-defined tag categories based on tagging rules. For example, the user may define a tagging rule indicating that data collected from data sources within a particular workcell or machine of the plant are to be tagged with a pre-defined tag that associates the data items with a person, product, or other classifier for indexing and searching purposes. The tags 1708 allow the user to define relationships between sets of data that may not be automatically discoverable by the discovery component 204 and its associated discovery agents. In some embodiments, the indexing system may also be configured to maintain a user-defined system view that allows a user to selectively associate different devices under a combined unit of organization. This user-defined association can subsequently be used by the search system to ensure that all relevant devices are located in response to a search query.

Returning now to FIG. 13, the transform component 206 provides the transformed data 1302 to indexing component 208, which indexes the discovered compatibility information in the compatibility data set 110. For example, if the newly discovered compatibility data pertains to one or more devices that were not previously represented in the compatibility data set 110, the indexing component 208 will create entries for the new devices and set the compatibility statuses for the relevant device pairs based on the compatibility information learned by the discovery component 204. If the discovered compatibility information relates to a compatibility status between two devices for which compatibility information is already available, the indexing component will update the compatibility status for that device pair, if necessary, based on the newly discovered information. For example, if the newly discovered information suggests a non-compatibility between a pair of devices that had previously been reported as compatibly by the compatibility data set, the indexing component 208 will either change the compatibility status for the device pair to "non-compatible," or reduce the degree of certainty that the two devices are compatible. In the later case, the indexing system 814 may also generate a note indicating the reason for the reduced degree of certainty, which is then tagged to that device pair for viewing on the compatibility result screen.

The automated discovery of compatibility data described above in connection with FIGS. 8-17 can further supplement the compatibility information provided by product vendors and end-users via manual interaction with the compatibility system 202, allowing the cross-product compatibility system 202 to quickly build a more detailed set of device compatibility status information relative to relying only on vendor-provided compatibility information. By combining crowd-sourced, end-user compatibility feedback and automatically discovered compatibility information with vendor-tested compatibility data, the cross-product compatibility system 202 can reduce the burden on product vendors to perform compatibility testing on all combinations of device models, firmware revisions, and software versions.

Figure 18:
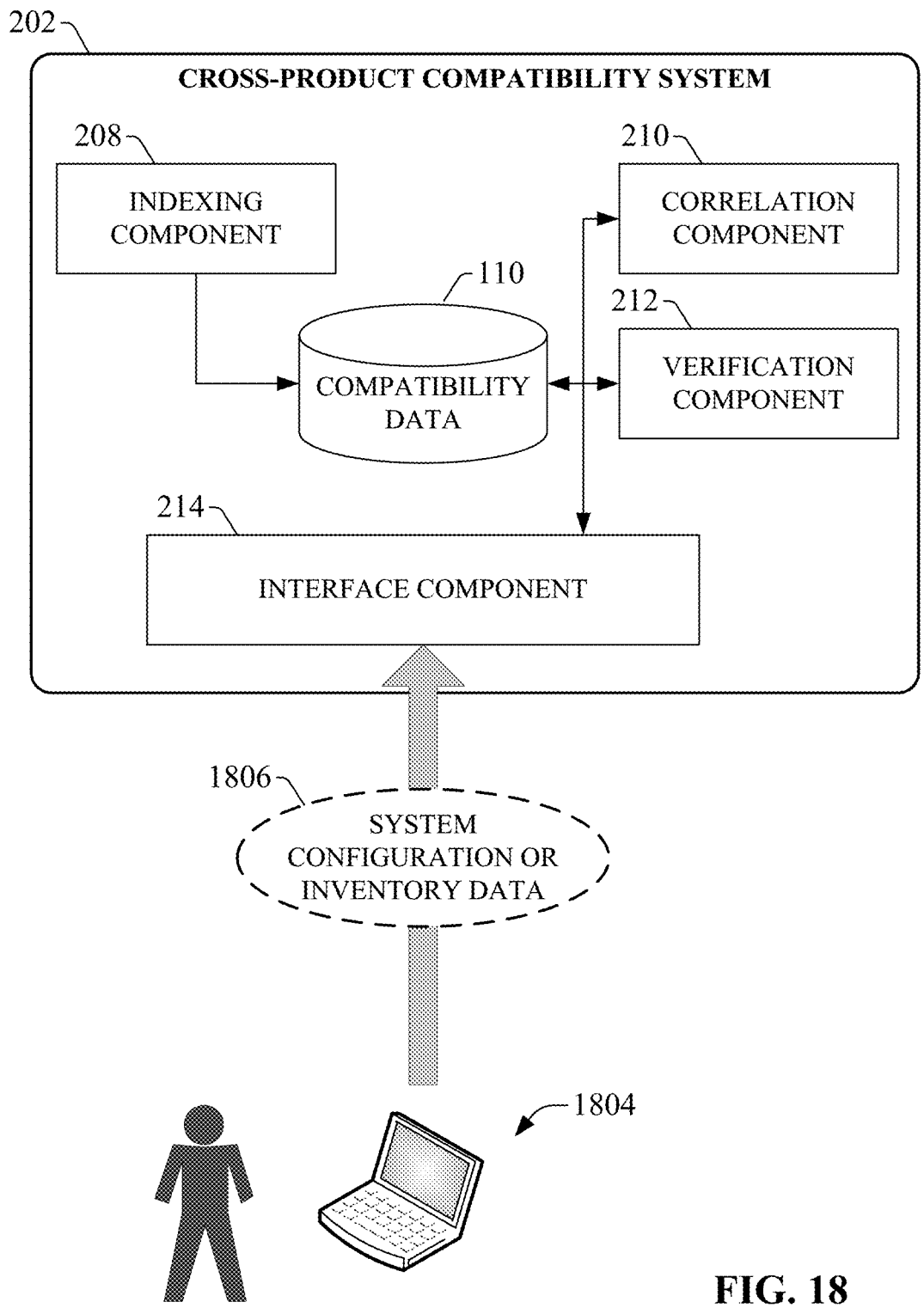
FIG. 18 is a diagram illustrating manual submission of system configuration or inventory data to a cross-product compatibility system.

As noted above, some embodiments of the cross-product compatibility system can allow users to manually provide device configuration or inventory information to a web-based or cloud-based service. The compatibility system can then use this information to update the compatibility ratings for the appropriate devices. FIG. 18 is a diagram illustrating manual submission of system configuration or inventory data 1806 to the system. In this example, interface component 214 can be configured to generate and serve specialized configuration entry display interfaces to a client device 1804. These display interfaces can guide a user through the process of entering system configuration or inventory data 214. Data submitted by the user can include, for example, data identifying the industrial devices in use at the user's plant facility, including indications of which devices are configured to functionally interact with one another. For example, the display interface may prompt the user to enter or select the vendor, model, and firmware version of an industrial controller in use at the facility, and further prompt the user to enter or select the vendor, model, and firmware version of each I/O module installed in the industrial controller. The system may also prompt the user to identify any additional devices that are configured to interact with the industrial controller, including but not limited to HMI terminals, motion devices such as variable frequency drives, or other such devices. This submitted system configuration or inventory data 1806 can then be used by the system to update the device compatibility data set 110. In particular, the compatibility statuses and/or ratings for the devices reported by the user can be updated based on the submitted configuration and inventory data.

In order to incentivize user to submit their asset configuration or inventory information, an administrator of compatibility system 202 can offer notification services to participating users in exchange for submission of their system configuration information. These notification services can leverage the configuration and/or inventory data submitted by the user to generate customized notifications relating to newly available product upgrades, new firmware revisions, customized system configuration recommendations that are likely to improve performance of the user's industrial systems, or other such notifications.

FIGS. 19-22 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 19:
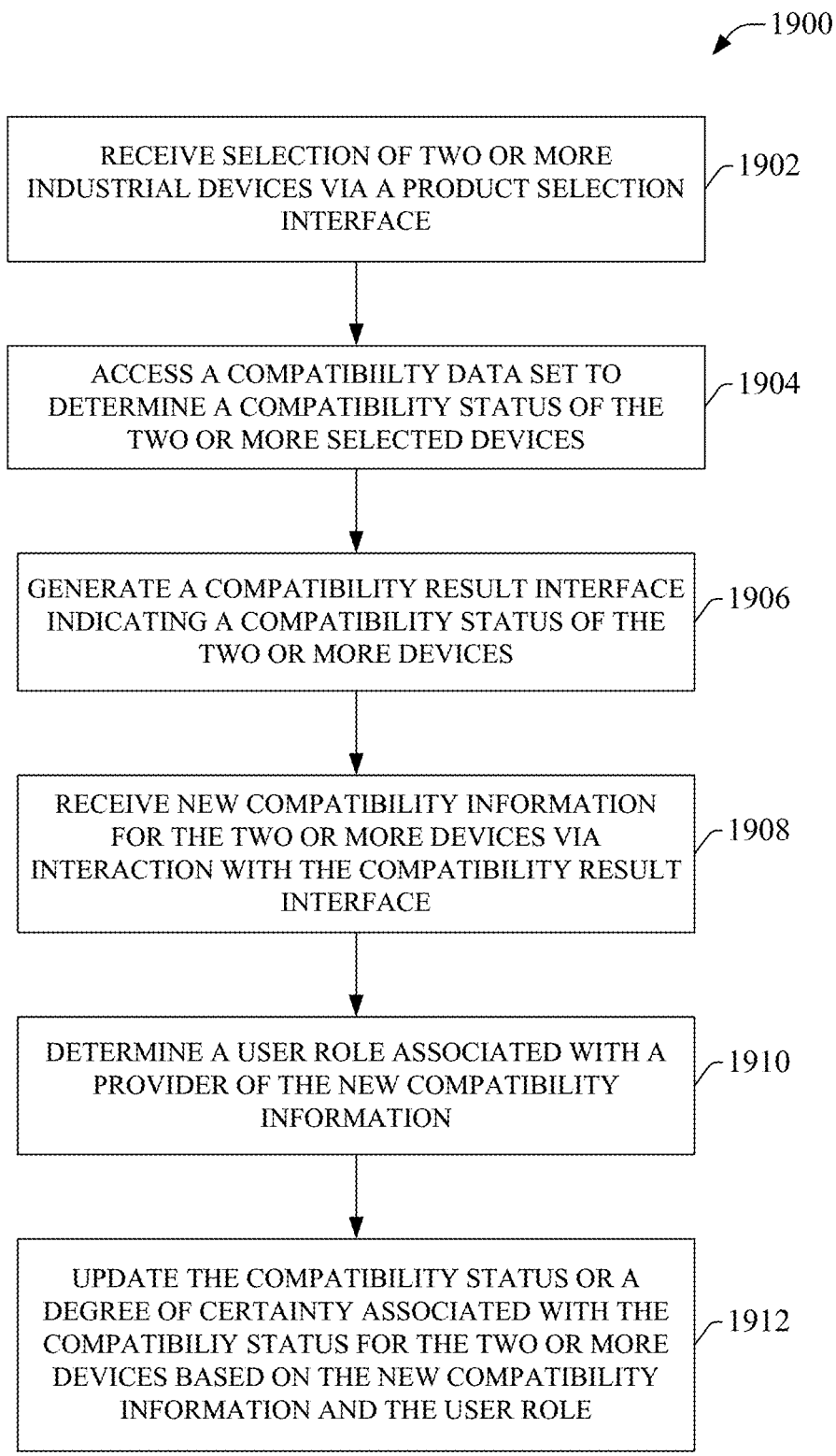
FIG. 19 is a flowchart of an example methodology for displaying and updated industrial device compatibility status information.

FIG. 19 illustrates an example methodology 1900 for displaying and updating industrial device compatibility status information. Initially, at 1902, selection of two or more industrial devices is received via a product selection interface. The product selection interface may be configured to allow the user to perform a text-based and/or category-based search of available industrial device models, and select devices of interest from the search results for compatibility comparison analysis. The product selection interface can also allow the user to select a firmware version for each device having a firmware installation. At 1904, a compatibility data set is accessed to determine a compatibility status of the two or more selected devices. The compatibility status can identify whether the two or more selected devices (running the selected firmware versions) are functionally compatible with one another. In some embodiments, the compatibility status may also indicate a degree of certainty associated with the compatibility status.

At 1906, a compatibility result interface is generated indicating the compatibility status for the two or more devices. In some embodiments, the compatibility result interface may comprise a compatibility grid, where each cell of the grid corresponds to a particular pair of devices, and contains a graphical indicator conveying the compatibility status (e.g., Compatible, Non-Compatible, Partially Compatible, Unknown, etc.) for that pair of devices. The compatibility result interface can also be configured to display previously received user feedback regarding compatibility, device rankings provided by users, and user comments conveying the users' experiences with regard to device compatibility.

At 1908, new compatibility information is received for the two or more devices via interaction with the compatibility result interface. The new compatibility information may be received, for example, in response to user selection of a cell in the compatibility grid corresponding to a pair of devices, and subsequent entry of the new compatibility information for display in the selected cell. At 1910, a user role associated with a provider of the new compatibility information is determined For example, the user role may distinguish between an end user (e.g., a plant employee who has purchased the devices for installation in their plant facility as part of an industrial automation system) and a product vendor responsible for producing and selling the devices. The user role may be determined based on log-in credentials entered by the user prior to entering the new compatibility information.

At 1912, at least one of the compatibility status or a degree of certainty associated with the compatibility status for the two or more devices is updated based on the new compatibility status received at step 1908 and the user role determined at step 1910. For example, if the new compatibility information was received by a product vendor, the system may override the previous compatibility status with the new compatibility status, and associate a high degree of certainty with the new compatibility status. Alternatively, if the new compatibility information was received by an end user, the system may update the compatibility status and/or the degree of certainty based on a determination algorithm that considers whether the new compatibility information contradicts previously received compatibility information, sources of the previously received compatibility information, a number of previously received compatibility status indications for that pair of devices, or other such criteria. For example, if the compatibility information provided by the end user contradicts a vendor-provided compatibility status previously provided by the vendor for that pair of devices, the system may ignore the new compatibility information, may change the degree of certainty associated with the previously provided compatibility status, or may allow the user to enter a comment for that pair of devices elaborating on the user's feedback regarding compatibility of the devices without changing the compatibility status, such that the comment can be viewed by other users of the system. If the compatibility information provided by the end user is entered for a pair of devices for which no vendor-provided compatibility status information has been provided, the system may aggregate the end user's compatibility feedback with that previously provided by other end users, and determine an aggregate compatibility status and degree of certainty for the pair of devices based on the ratio of "compatible" to "non-compatible" status provided by the end users.

Figure 20:
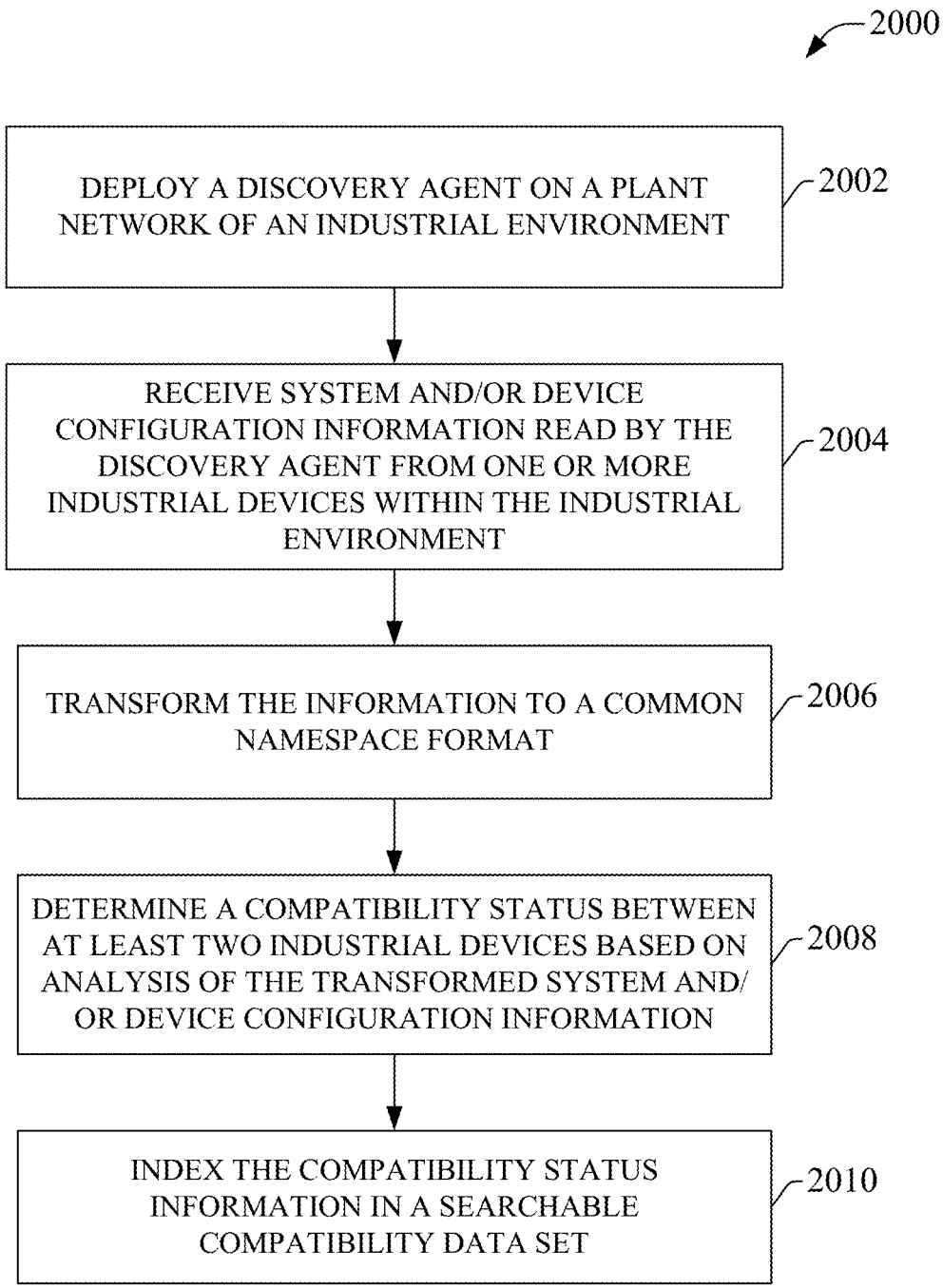
FIG. 20 is a flowchart of an example methodology for automatically and remotely determining device compatibility information based on device and system configuration information collected by a discovery agent.

FIG. 20 illustrates an example methodology 2000 for automatically and remotely determining device compatibility information based on device and system configuration information collected by a discovery agent. Initially, at 2002, a discovery agent is deployed on a plant network of an industrial environment. The discovery agent may comprise, for example, a software script that traverses the customer's plant network to discover industrial devices in use within the customer's industrial facility containing data (e.g., system or device configuration information) that may be relevant in connection with determining device compatibility. In some embodiments, the discovery agent may be deployed by a cross-product compatibility system located on an external network relative to the customer's industrial facility. In such embodiments, the cross-product compatibility system can deploy the discovery agent on the customer's plant network via the Internet or a cloud platform.

At 2004, system and/or device configuration information read by the discovery agent from one or more industrial devices within the industrial environment is received from the discovery agent. The system and/or device configuration information can comprise, for example, I/O or network configuration information read from an industrial controller, communication configuration information read from an HMI terminal, motor drive, or other industrial device indicating devices with which the industrial device is configured to communicate, or other such information. At 2006, the received system and/or device configuration information is transformed to a common format for collective analysis by the cross-product compatibility system. At 2008, a compatibility status between at least two industrial devices is determined based on analysis of the transformed system and/or device configuration information. At 2010, the compatibility status information is indexed in a searchable compatibility data set.

Figure 21:
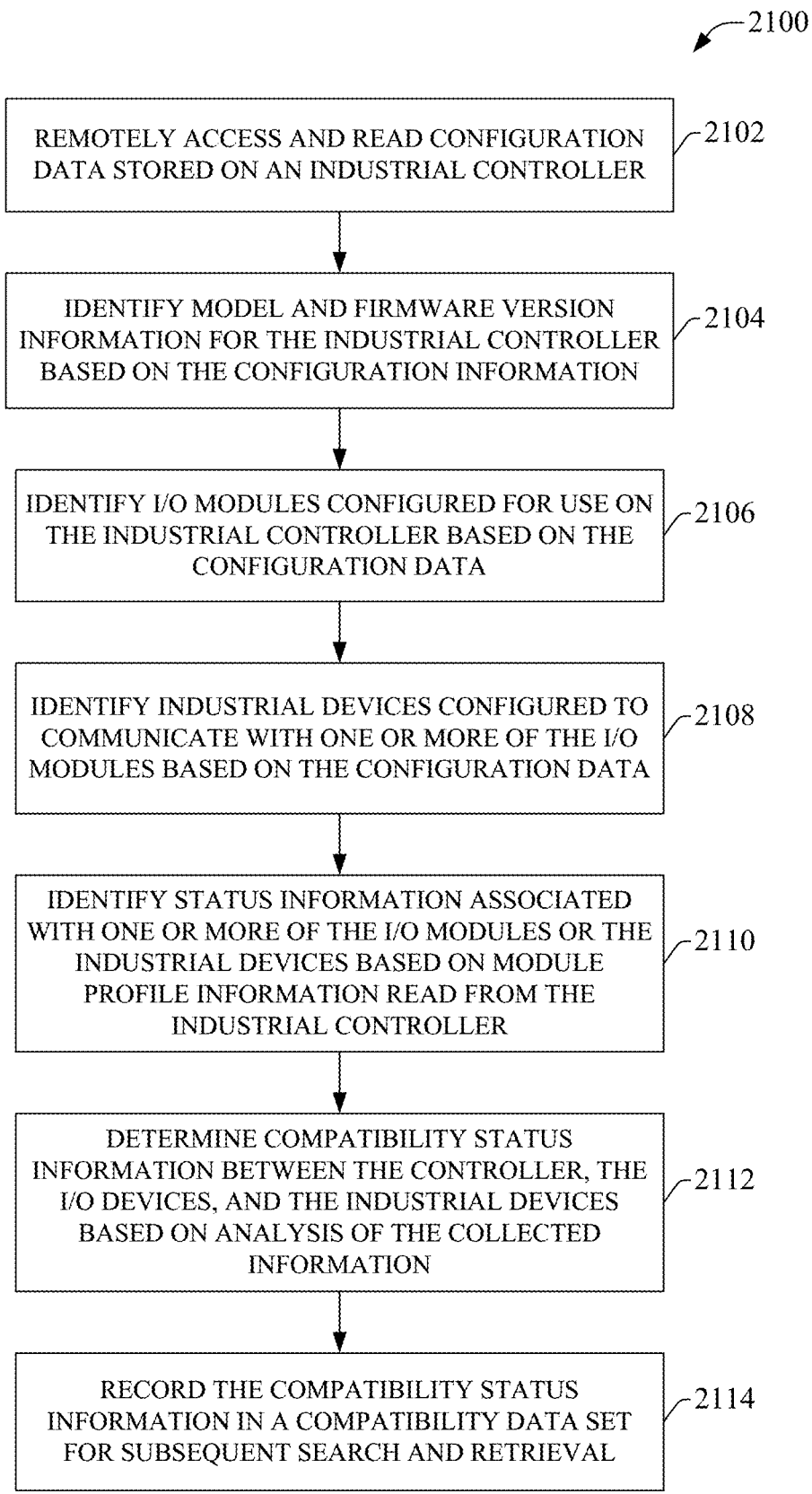
FIG. 21 is a flowchart of an example methodology for collecting and analyzing system configuration information from an industrial controller to determine device compatibility information.

FIG. 21 is an example methodology 2100 for collecting and analyzing system configuration information from an industrial controller to determine device compatibility information. Initially, at 2102, configuration data stored on an industrial controller is remotely accessed and read. In some embodiments, the configuration data can be accessed and read by a discovery agent deployed by a cross-product compatibility system, as described above. At 2104, model and firmware information for the industrial controller is identified based on the configuration information. At 2106, I/O modules configured for use on the industrial controller are identified based on the configuration data. At 2108, industrial devices configured to communicate with one or more of the I/O modules are identified based on the configuration data. At 2110, status information associated with one or more of the identified I/O devices is identified based on module profile information read from the industrial controller (e.g., by the discovery agent). The information identified in steps 2104-2110 can be identified by the cross-product compatibility system based on the system and/or device configuration information accessed and read by the discovery agent. At 2112, compatibility status information between the controller, the I/O devices, and the industrial devices is determined based on analysis of the information collected at steps 2104-2110. At 2114, the compatibility status information determined at step 2112 is recorded in a compatibility data set for subsequent search and retrieval.

Figure 22:
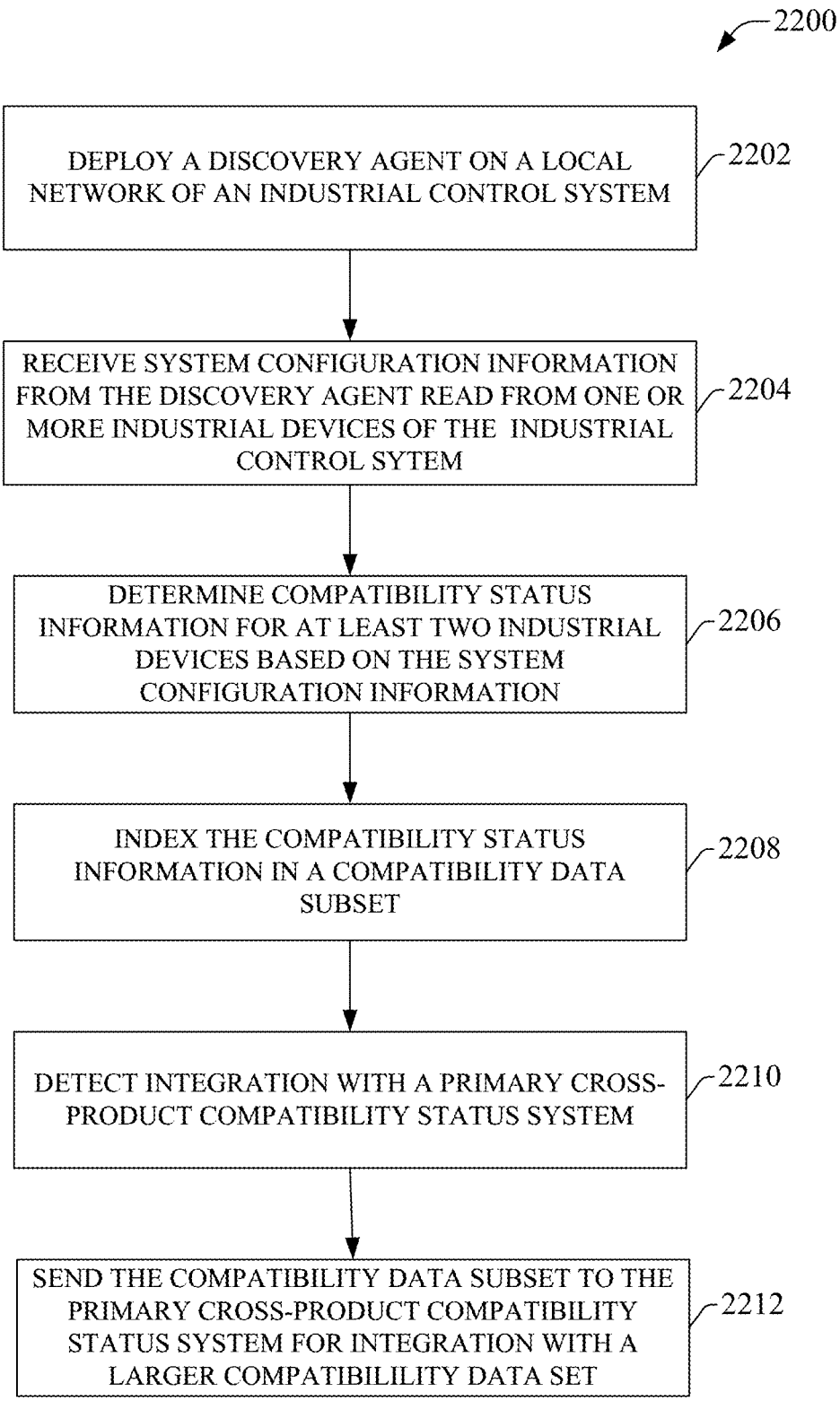
FIG. 22 is a flowchart of an example methodology for pre-analyzing system configuration information for an industrial control system prior to deployment in a plant facility in order to determine device compatibility information that can be delivered to a publicly accessible cross-product device compatibility system.

FIG. 22 illustrates an example methodology 2200 for pre-analyzing system configuration information for an industrial control system prior to deployment in a plant facility in order to determine device compatibility information that can be delivered to a publicly accessible cross-product device compatibility system. Initially, at 2202, a discovery agent is deployed on a local network of an industrial control system. The industrial control system may comprise, for example, an integrated control system housed in one or more control cabinets to be installed at a customer's plant facility. In some embodiments, the discovery agent may be deployed by a cross-product compatibility sub-system embodied on an industrial controller of the industrial control system and configured to exchange data with a larger, publicly accessible compatibility system. At 2204, system configuration information read by the discovery agent from one or more industrial devices of the industrial control system is received. The system configuration information can comprise, for example, I/O module configuration information read from the industrial controller itself, network communication settings read from the industrial devices, or other such information.

At 2206, compatibility status information is determined for at least two industrial devices based on the system configuration information. At 2208, the compatibility status information is indexed in a compatibility data subset maintained on the industrial controller. The compatibility data subset defines device compatibility statuses between devices of the industrial control system inferred based on analysis of the system configuration information. At 2210, integration with a primary cross-product compatibility status system is detected. For example, upon installation of the control cabinet at the plant facility, the compatibility sub-system of the industrial controller may discover the primary cross-product compatibility system on an external network (e.g., based on communication settings defined on the industrial controller). Upon establishing communication with the cross-product compatibility system, the compatibility data subset is sent to the cross-product compatibility system at 2212 for integration with a larger set of industrial device compatibility data maintained by the publically accessible compatibility system.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, instrumentation, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet, DH/DH+, Remote I/O, Fieldbus, Modbus, Profibus, CAN, wireless networks, serial protocols, near field communication (NFC), Bluetooth, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 23:
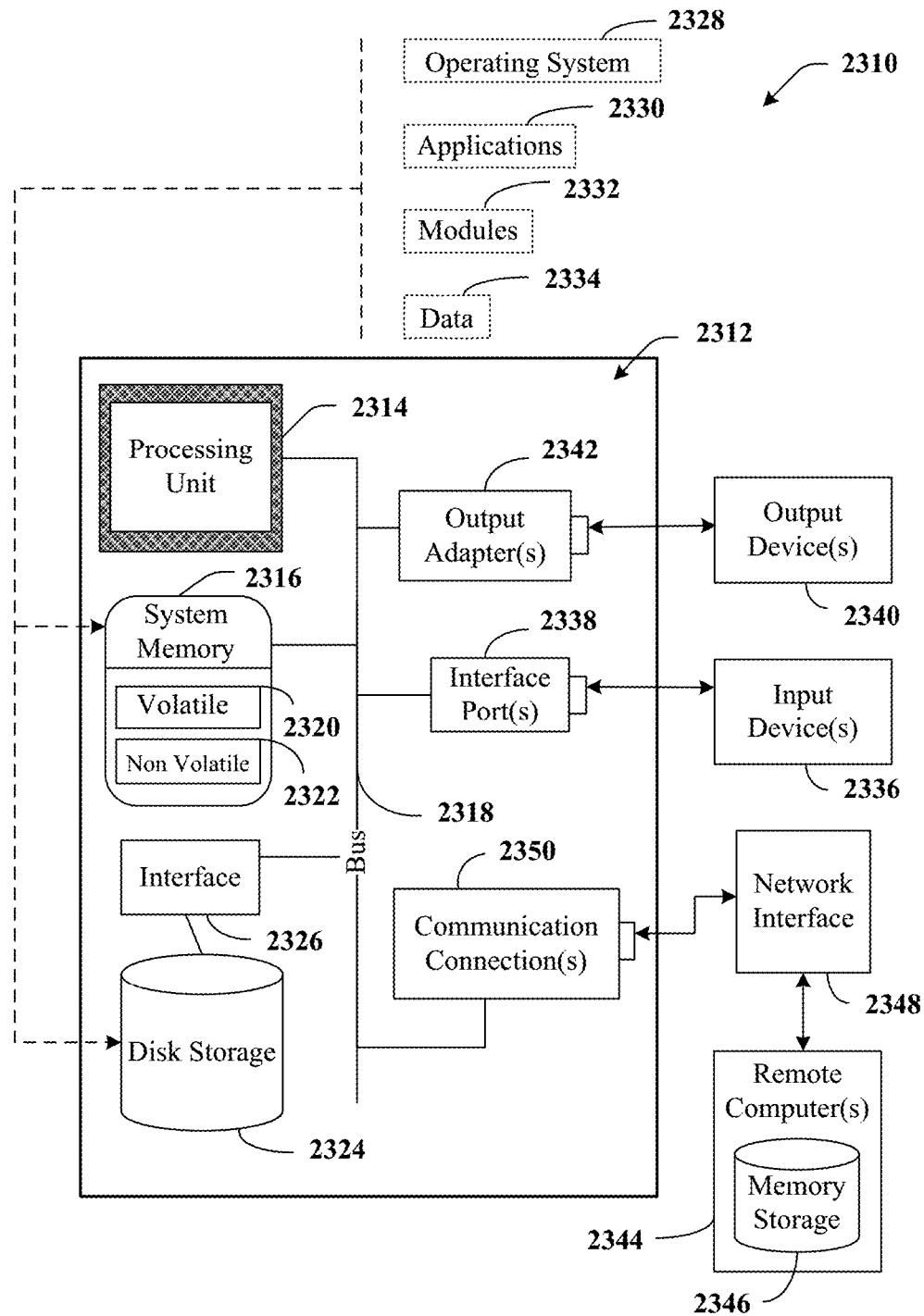
FIG. 23 is an example computing environment.
Figure 24:
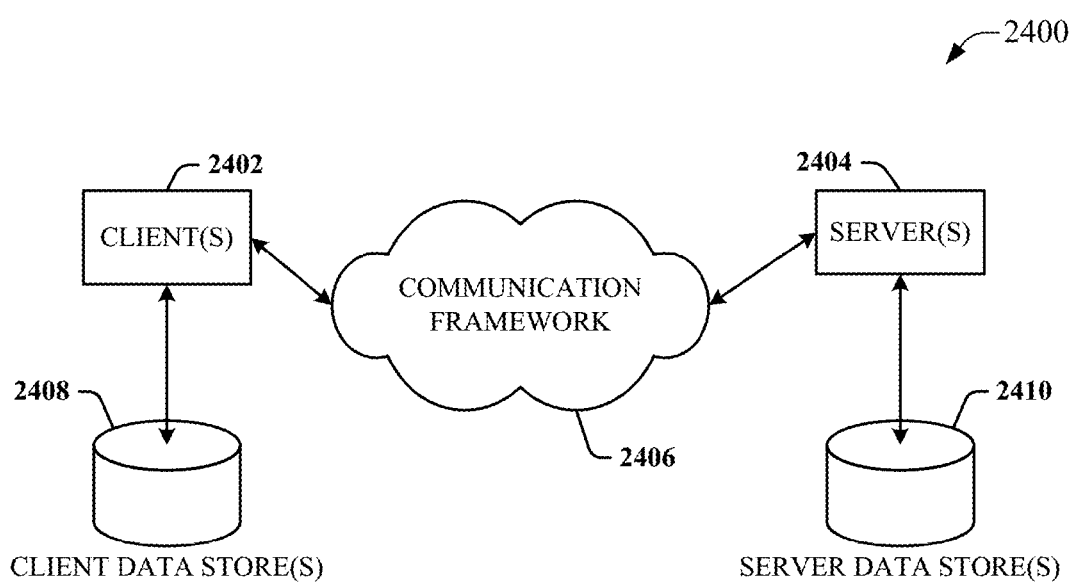
FIG. 24 is an example networking environment.

In order to provide a context for the various aspects of the disclosed subject matter, FIGS. 23 and 24 as well as the following discussion are intended to provide a brief, general description of a suitable environment in which the various aspects of the disclosed subject matter may be implemented.

With reference to FIG. 23, an example environment 2310 for implementing various aspects of the aforementioned subject matter includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Multi-core microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable PROM (EEPROM), or flash memory. Volatile memory 2320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2312 also includes removable/non-removable, volatile/non-volatile computer storage media. FIG. 23 illustrates, for example a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2324 to the system bus 2318, a removable or non-removable interface is typically used such as interface 2326.

It is to be appreciated that FIG. 23 describes software that acts as an intermediary between users and the basic computer resources described in suitable operating environment 2310. Such software includes an operating system 2328. Operating system 2328, which can be stored on disk storage 2324, acts to control and allocate resources of the computer 2312. System applications 2330 take advantage of the management of resources by operating system 2328 through program modules 2332 and program data 2334 stored either in system memory 2316 or on disk storage 2324. It is to be appreciated that one or more embodiments of the subject disclosure can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312, and to output information from computer 2312 to an output device 2340. Output adapters 2342 are provided to illustrate that there are some output devices 2340 like monitors, speakers, and printers, among other output devices 2340, which require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL). Network interface 2348 can also encompass near field communication (NFC) or Bluetooth communication.

Communication connection(s) 2350 refers to the hardware/software employed to connect the network interface 2348 to the system bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

FIG. 24 is a schematic block diagram of a sample computing environment 2400 with which the disclosed subject matter can interact. The sample computing environment 2400 includes one or more client(s) 2402. The client(s) 2402 can be hardware and/or software (e.g., threads, processes, computing devices). The sample computing environment 2400 also includes one or more server(s) 2404. The server(s) 2404 can also be hardware and/or software (e.g., threads, processes, computing devices). The servers 2404 can house threads to perform transformations by employing one or more embodiments as described herein, for example. One possible communication between a client 2402 and servers 2404 can be in the form of a data packet adapted to be transmitted between two or more computer processes. The sample computing environment 2400 includes a communication framework 2406 that can be employed to facilitate communications between the client(s) 2402 and the server(s) 2404. The client(s) 2402 are operably connected to one or more client data store(s) 2408 that can be employed to store information local to the client(s) 2402. Similarly, the server(s) 2404 are operably connected to one or more server data store(s) 2410 that can be employed to store information local to the servers 2404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for collecting and rendering device compatibility status information, comprising:
    a memory that stores computer-executable components;
    a processor, operatively coupled to the memory, that executes the computer-executable components, the computer-executable components comprising:
        a compatibility data storage area configured to store compatibility status information identifying compatibility statuses for multiple pairs of industrial devices;
        an interface component configured to receive, via one or more interface displays delivered to a client device, selection information from the client device that identifies a set of industrial devices;
        a search component configured to retrieve a subset of the compatibility status information, for at least two industrial devices of the set of industrial devices, from the compatibility data storage area based on the selection information, wherein the interface component is further configured to render the subset of the compatibility status information on the client device via the one or more interface displays; and
        a correlation component configured to determine a composite compatibility status for the at least two industrial devices based on an aggregation of new compatibility status information, for the at least two industrial devices, received via the one or more interface displays and previously received compatibility status information for the at least two industrial devices, and to update the subset of the compatibility status information stored in the compatibility data storage area in accordance with the aggregate compatibility status, wherein the correlation component updates the subset of the compatibility data based on a user role associated with the client device.

2. The system of claim 1, wherein at least one of the one or more interface displays comprises a compatibility grid having multiple cells, and wherein a cell of the multiple cells displays at least one of a graphic symbol or a text string indicating whether a pair of the industrial devices represented by the cell are functionally compatible.

3. The system of claim 2, wherein the interface component is further configured to receive, via the one or more interface displays, user feedback information relating to compatibility of the at least two industrial devices, and to display the feedback information on the at least one of the one or more interface displays.

4. The system of claim 1, further comprising a verification component configured to determine how to update the subset of the compatibility status information using the new compatibility status information based on verification criteria data defining one or more sets of verification criteria.

5. The system of claim 4, wherein the one or more sets of verification criteria comprise at least a first set of verification criteria corresponding to an end user role and a second set of verification criteria corresponding to a device vendor role.

6. The system of claim 5, wherein the verification component is further configured to in response to a determination that the user role is the device vendor role, instruct the correlation component to replace a current compatibility status indication for a pair of industrial devices specified by the subset of the compatibility status information with a new compatibility status indication specified by the new compatibility status information, and in response to a determination that the user role is the end user role, instruct the correlation component to update the current compatibility status indication based on the composite compatibility status.

7. The system of claim 1, wherein the correlation component is further configured to generate certainty data for the at least two industrial devices indicating a degree of certainty associated with the composite compatibility status, and wherein the degree of certainty is based on the aggregation of the new compatibility status information and the previously received compatibility status information for the at least two industrial devices.

8. The system of claim 1, further comprising:
a discovery component configured to discover and retrieve device configuration information residing on one or more of the industrial devices; and
an indexing component configured to determine a new compatibility status for two industrial devices based on the device configuration information and to update the compatibility status information to reflect the new compatibility status.

9. A method for updating and rendering device compatibility information, comprising:
storing, by a system comprising at least one processor, compatibility status information on a compatibility data store, wherein the compatibility status information identifies compatibility statuses for multiple pairs of industrial devices;
receiving, by the system via interaction with one or more interface displays, selection information from a client device, wherein the selection information identifies at least two industrial devices;
retrieving, by the system from the compatibility data store, a subset of the compatibility status information for the at least two industrial devices based on the selection information;
displaying, by the system, the subset of the compatibility status information on the client device via the one or more interface displays;
receiving, by the system from the client device, new compatibility status information for the at least two industrial devices via interaction with the one or more interface displays;
determining, by the system, a user role associated with the client device; and
modifying, by the system based on the user role, the subset of the compatibility status information in accordance with a composite compatibility status determined based on an aggregation of the new compatibility status information with previously received compatibility status information for the at least two industrial devices.

10. The method of claim 9, wherein the displaying comprises displaying the subset of the compatibility status information on a compatibility grid rendered by an interface display of the one or more interface displays, and wherein the compatibility grid comprises at least one cell, corresponding to the at least two industrial devices, that displays a graphic symbol or a text string indicating whether the at least two industrial devices are functionally compatible.

11. The method of claim 9, wherein the modifying comprises modifying the subset of the compatibility status information based on a set of verification criteria, selected from multiple defined sets of verification criteria stored in a verification criteria data store, corresponding to the user role.

12. The method of claim 11, further comprising, in response to determining that the user role is a product vendor role, replacing, by the system, a current compatibility status indication for that at least two industrial devices with a new compatibility status indication specified by the new compatibility status information.

13. The method of claim 11, further comprising, in response to determining that the user role is an end user role,
updating, by the system, a current compatibility status indication for the at least two industrial devices based on the composite compatibility status to yield an updated compatibility status indication.

14. The method of claim 13, further comprising generating, by the system, certainty data for the at least two industrial devices specifying a degree of certainty associated with the updated compatibility status indication.

15. The method of claim 14, wherein the aggregating comprises determining, by the system, a ratio of first received indications specifying that the at least two industrial devices are functionally compatible to second received indications specifying that the at least two industrial devices are functionally incompatible, and the generating the certainty data comprises generating the certainty data based on the ratio.

16. The method of claim 14, wherein the generating the certainty data comprises determining the degree of certainty based on a reported number of industrial systems that include the at least two industrial devices.

17. The method of claim 9, further comprising:
discovering and retrieving, by the system, device configuration information residing on one or more of the industrial devices;
determining a new compatibility status between two industrial devices based on the device configuration information; and
updating the compatibility status information stored in the compatibility data store to reflect the new compatibility status.

18. A non-transitory computer-readable medium having stored thereon instructions that, in response to execution, cause a system comprising a processor to perform operations, the operations comprising:
storing compatibility status information on a compatibility data storage memory, wherein the compatibility status information defines compatibility statuses for multiple pairs of industrial devices;
receiving, via interaction with one or more interface displays, selection information from a client device, the selection information identifying a pair of industrial devices;
retrieving from the compatibility data storage memory, a subset of the compatibility status information for the pair of industrial devices based on the selection information;
displaying the subset of the compatibility status information on the client device via the one or more interface displays;
receiving, from a client device, new compatibility status information for the pair of industrial devices via interaction with the one or more interface displays;

determining a user role associated with the client device;
determining a composite compatibility status based on an aggregation of the new compatibility status information and previously received compatibility status information for the pair of industrial devices; and
modifying, based on the user role, the subset of the compatibility status information in accordance with the composite compatibility status.

19. The non-transitory computer-readable medium of claim 18, wherein the modifying comprises:
selecting a set of verification criteria, from multiple stored role-specific sets of verification criteria, based on the user role; and
modifying the subset of the compatibility status information based on the set of verification criteria.

* * * * *